United States Patent
Jin et al.

(10) Patent No.: US 11,301,500 B2
(45) Date of Patent: Apr. 12, 2022

(54) CLUSTERING FOR GEO-ENRICHED DATA

(71) Applicant: SAP SE, Walldorf (DE)

(72) Inventors: Xing Jin, Vancouver (CA); Jonathan Tiu, Surrey (CA); Kyoung Woo Nam, Coquitlam (CA); Sae-Won Om, Burnaby (CA)

(73) Assignee: SAP SE, Walldorf (DE)

( * ) Notice: Subject to any disclaimer, the term of this patent is extended or adjusted under 35 U.S.C. 154(b) by 604 days.

(21) Appl. No.: 15/394,142

(22) Filed: Dec. 29, 2016

(65) Prior Publication Data

US 2018/0189320 A1 Jul. 5, 2018

(51) Int. Cl.
| | |
|---|---|
| *G06F 16/29* | (2019.01) |
| *G06F 16/24* | (2019.01) |
| *G06F 16/28* | (2019.01) |
| *G06F 16/35* | (2019.01) |
| *G06F 16/26* | (2019.01) |

(52) U.S. Cl.
CPC ............ *G06F 16/29* (2019.01); *G06F 16/24* (2019.01); *G06F 16/26* (2019.01); *G06F 16/287* (2019.01); *G06F 16/35* (2019.01)

(58) Field of Classification Search
CPC ......... G06F 16/29; G06F 16/24; G06F 16/287
See application file for complete search history.

(56) References Cited

U.S. PATENT DOCUMENTS

| | | | | |
|---|---|---|---|---|
| 5,790,121 A | * | 8/1998 | Sklar | G06F 16/26 715/853 |
| 6,025,843 A | * | 2/2000 | Sklar | G06F 16/2425 715/841 |
| 9,047,847 B2 | * | 6/2015 | Hochmuth | G09G 5/377 |
| 9,514,155 B1 | * | 12/2016 | Majumdar | G06F 16/29 |
| 2004/0093321 A1 | * | 5/2004 | Roustant | G06F 16/9535 |
| 2007/0061074 A1 | * | 3/2007 | Safoutin | G01C 21/3682 701/431 |

(Continued)

OTHER PUBLICATIONS

T. Wang, E. Zhong, H. Lu and H. Zheng, "Multi-scale display of point data sets at the client side," 2010 18th International Conference on Geoinformatics, Beijing, China, 2010, pp. 1-4, doi: 10.1109/GEOINFORMATICS.2010.5568108. (Year: 2010).*

(Continued)

*Primary Examiner* — Brittany N Allen
(74) *Attorney, Agent, or Firm* — Fountainhead Law Group P.C.

(57) ABSTRACT

Some embodiments provide a program that receives a set of clusters generated from a set of geo-enriched data. The program further identifies a subset of the set of clusters that intersect a map extent of a map. Upon determining that a number of geo-enriched data represented by the subset of the set of clusters is greater than a threshold number, the program renders the map extent of the map to include the subset of the set of clusters. Upon determining that the number of geo-enriched data represented by the subset of the set of clusters is not greater than the threshold number, the program further sends a query for a subset of the set of geo-enriched data that is within the map extent, receives the subset of the set of geo-enriched data and renders the map extent of the map to include the subset of the set of geo-enriched data.

17 Claims, 15 Drawing Sheets

(56) References Cited

U.S. PATENT DOCUMENTS

| | | | |
|---|---|---|---|
| 2007/0285426 A1* | 12/2007 | Matina | G06T 11/206 345/440 |
| 2008/0010605 A1* | 1/2008 | Frank | G06F 16/38 715/765 |
| 2008/0147660 A1* | 6/2008 | Jarczyk | G09B 29/007 |
| 2008/0281869 A1* | 11/2008 | Liu | G06F 16/9537 |
| 2009/0061902 A1* | 3/2009 | Abhyanker | H04W 4/029 455/456.3 |
| 2009/0169060 A1* | 7/2009 | Faenger | G09B 29/007 382/113 |
| 2011/0041088 A1* | 2/2011 | Mason | G06Q 10/0631 715/767 |
| 2011/0225541 A1* | 9/2011 | Ramos | G09B 29/007 715/790 |
| 2013/0304725 A1 | 11/2013 | Nee et al. | |
| 2014/0218394 A1* | 8/2014 | Hochmuth | G06F 3/03 345/629 |
| 2015/0169139 A1 | 6/2015 | Leva et al. | |
| 2015/0262399 A1* | 9/2015 | Popescu | G06F 16/29 345/630 |
| 2016/0034828 A1* | 2/2016 | Sarawgi | G06Q 10/02 705/5 |
| 2016/0321351 A1 | 11/2016 | Mor et al. | |

OTHER PUBLICATIONS

Sarma et al., Consistent thinning of large geographical data for map visualization, ACM Transactions on Database Systems, Dec. 2013, Article No. 22, https://doi.org/10.1145/2539032.2539034 (Year: 2013).*

Mohammad Rezaei, Pasi Franti, Real-Time Clustering of Large Geo-Referenced Data for Visualizing on Map, Advances in Electrical and Computer Engineering vol. 18, No. 4, 2018 (Year: 2018).*

* cited by examiner

CLUSTERING FOR GEO-ENRICHED DATA

CROSS-REFERENCE TO RELATED APPLICATION

The present application is related to U.S. application Ser. No. 15/299,245, filed Oct. 20, 2016, entitled "Map Extent-Based Querying for Geo-Enriched Data," the entire contents of which are incorporated herein by reference in its entirety for all purposes.

BACKGROUND

Maps and mapping technology are used in many current computing and mobile applications and services. For example, some applications or services utilize mapping technology to provide navigation functions, location functions, traffic congestion functions, etc. Other applications or services may employ mapping technology to provide location-based search functions, social-networking functions, ride-sharing services, etc.

SUMMARY

In some embodiments, a non-transitory machine-readable medium stores a program. The program receives a set of clusters generated from a set of geo-enriched data. The program further identifies a subset of the set of clusters that intersect a map extent of a map. Upon determining that a number of geo-enriched data represented by the subset of the set of clusters is greater than a threshold number, the program also renders the map extent of the map to include the subset of the set of clusters. Upon determining that the number of geo-enriched data represented by the subset of the set of clusters is not greater than the threshold number, the program further sends a query for a subset of the set of geo-enriched data that is within the map extent, receives the subset of the set of geo-enriched data and renders the map extent of the map to include the subset of the set of geo-enriched data.

In some embodiments, rendering the map extent of the map may include merging the subset of the set of clusters to form a set of cluster groups and rendering the map extent of the map to include the set of cluster groups. Merging the subset of the set of clusters may include, for each cluster in the subset of the set of clusters, adding the cluster to a cluster group in the set of cluster groups when a distance between a reference point of the cluster and a reference point of the cluster group is less than a defined distance and creating a new cluster group in the set of cluster groups and adding the cluster to the new cluster group when the distance between the reference point of the cluster and the reference point of the cluster group is not less than the defined distance. Adding the cluster to the cluster group in the set of cluster groups may include updating the reference point of the cluster group based on the reference point of the cluster, a size of the cluster, and a size of the cluster group. Adding the cluster to the cluster group in the set of cluster groups may include updating a size of the cluster group based on a size of the cluster and the size of the cluster group.

In some embodiments, each geo-enriched data in the set of geo-enriched data may include an attribute. The program may further send a request for a maximum value of the attribute in the set of geo-enriched data and a minimum value of the attribute in the set of geo-enriched data. Rendering the map extent of the map to include the subset of the set of geo-enriched data may include rendering a visual representation of a geo-enriched data in the subset of the set of geo-enriched data based on a value of the attribute of the geo-enriched data relative to the maximum value and the minimum value. The map extent may be first map extent of the map, the subset of the set of clusters may be a first subset of the set of clusters, the query may be a first query, and the subset of the set of geo-enriched data may be a first subset of the set of geo-enriched data. The program may further receive a request to render a second map extent of the map. The program may also identify a second subset of the set of clusters that intersect the second map extent. Upon determining that a number of geo-enriched data represented by the second subset of the set of clusters is greater than the threshold number, the program may further render the second map extent of the map to include the second subset of the set of clusters. Upon determining that the number of geo-enriched data represented by the second subset of the set of clusters is not greater than the threshold number, the program may also sends a second query for a second subset of the set of geo-enriched data represented by the second subset of the set of clusters, receive the second subset of the set of geo-enriched data, and render the second map extent of the map to include the second subset of the set of geo-enriched data.

In some embodiments, a method receives a set of clusters generated from a set of geo-enriched data. The method further identifies a subset of the set of clusters that intersect a map extent of a map. Upon determining that a number of geo-enriched data represented by the subset of the set of clusters is greater than a threshold number, the method also renders the map extent of the map to include the subset of the set of clusters. Upon determining that the number of geo-enriched data represented by the subset of the set of clusters is not greater than the threshold number, the method further sends a query for a subset of the set of geo-enriched data that is within the map extent, receives the subset of the set of geo-enriched data, and renders the map extent of the map to include the subset of the set of geo-enriched data.

In some embodiments, rendering the map extent of the map may include merging the subset of the set of clusters to form a set of cluster groups and rendering the map extent of the map to include the set of cluster groups. Merging the subset of the set of clusters may include, for each cluster in the subset of the set of clusters adding the cluster to a cluster group in the set of cluster groups when a distance between a reference point of the cluster and a reference point of the cluster group is less than a defined distance and creating a new cluster group in the set of cluster groups and adding the cluster to the new cluster group when the distance between the reference point of the cluster and the reference point of the cluster group is not less than the defined distance. Adding the cluster to the cluster group in the set of cluster groups may include updating the reference point of the cluster group based on the reference point of the cluster, a size of the cluster, and a size of the cluster group. Adding the cluster to the cluster group in the set of cluster groups may include updating a size of the cluster group based on a size of the cluster and the size of the cluster group.

In some embodiments, each geo-enriched data in the set of geo-enriched data may include an attribute. The method may further send a request for a maximum value of the attribute in the set of geo-enriched data and a minimum value of the attribute in the set of geo-enriched data. Rendering the map extent of the map to include the subset of the set of geo-enriched data may include rendering a visual representation of a geo-enriched data in the subset of the set of geo-enriched data based on a value of the attribute of the geo-enriched data relative to the maximum value and the minimum value. The map extent may be first map extent of the map, the subset of the set of clusters may be a first subset of the set of clusters, the query may be a first query, and the subset of the set of geo-enriched data may be a first subset of the set of geo-enriched data. The method may further receives a request to render a second map extent of the map. The method may also identify a second subset of the set of clusters that intersect the second map extent. Upon determining that a number of geo-enriched data represented by the second subset of the set of clusters is greater than the threshold number, the method may further render the second map extent of the map to include the second subset of the set of clusters. Upon determining that the number of geo-enriched data represented by the second subset of the set of clusters is not greater than the threshold number, the method may also send a second query for a second subset of the set of geo-enriched data represented by the second subset of the set of clusters, receive the second subset of the set of geo-enriched data, and render the second map extent of the map to include the second subset of the set of geo-enriched data.

In some embodiments, a system includes a set of processing units and a non-transitory computer-readable medium that stores instructions. The instructions cause at least one processing unit to receive a set of clusters generated from a set of geo-enriched data. The instructions further cause the at least one processing unit to identify a subset of the set of clusters that intersect a map extent of a map. Upon determining that a number of geo-enriched data represented by the subset of the set of clusters is greater than a threshold number, the instructions also cause the at least one processing unit to render the map extent of the map to include the subset of the set of clusters. Upon determining that the number of geo-enriched data represented by the subset of the set of clusters is not greater than the threshold number, the instructions further cause the at least one processing unit to send a query for a subset of the set of geo-enriched data that is within the map extent, receive the subset of the set of geo-enriched data, and render the map extent of the map to include the subset of the set of geo-enriched data.

In some embodiments, rendering the map extent of the map may include merging the subset of the set of clusters to form a set of cluster groups and rendering the map extent of the map to include the set of cluster groups. Merging the subset of the set of clusters may include, for each cluster in the subset of the set of clusters adding the cluster to a cluster group in the set of cluster groups when a distance between a reference point of the cluster and a reference point of the cluster group is less than a defined distance and creating a new cluster group in the set of cluster groups and adding the cluster to the new cluster group when the distance between the reference point of the cluster and the reference point of the cluster group is not less than the defined distance. Adding the cluster to the cluster group in the set of cluster groups may include updating the reference point of the cluster group based on the reference point of the cluster, a size of the cluster, and a size of the cluster group and updating a size of the cluster group based on a size of the cluster and the size of the cluster group.

In some embodiments, each geo-enriched data in the set of geo-enriched data may include an attribute. The instructions may further cause the at least one processing unit to send a request for a maximum value of the attribute in the set of geo-enriched data and a minimum value of the attribute in the set of geo-enriched data. Rendering the map extent of the map to include the subset of the set of geo-enriched data may include rendering a visual representation of a geo-enriched data in the subset of the set of geo-enriched data based on a value of the attribute of the geo-enriched data relative to the maximum value and the minimum value. The map extent may be first map extent of the map, the subset of the set of clusters may be a first subset of the set of clusters, the query may be a first query, and the subset of the set of geo-enriched data may be a first subset of the set of geo-enriched data. The instructions may further cause the at least one processing unit to receive a request to render a second map extent of the map. The instructions may also cause the at least one processing unit to identify a second subset of the set of clusters that intersect the second map extent. Upon determining that a number of geo-enriched data represented by the second subset of the set of clusters is greater than the threshold number, the instructions may further cause the at least one processing unit to render the second map extent of the map to include the second subset of the set of clusters. Upon determining that the number of geo-enriched data represented by the second subset of the set of clusters is not greater than the threshold number, the instructions may also cause the at least one processing unit to send a second query for a second subset of the set of geo-enriched data represented by the second subset of the set of clusters, receive the second subset of the set of geo-enriched data, and render the second map extent of the map to include the second subset of the set of geo-enriched data.

The following detailed description and accompanying drawings provide a better understanding of the nature and advantages of the present invention.

DETAILED DESCRIPTION

Figure 1:
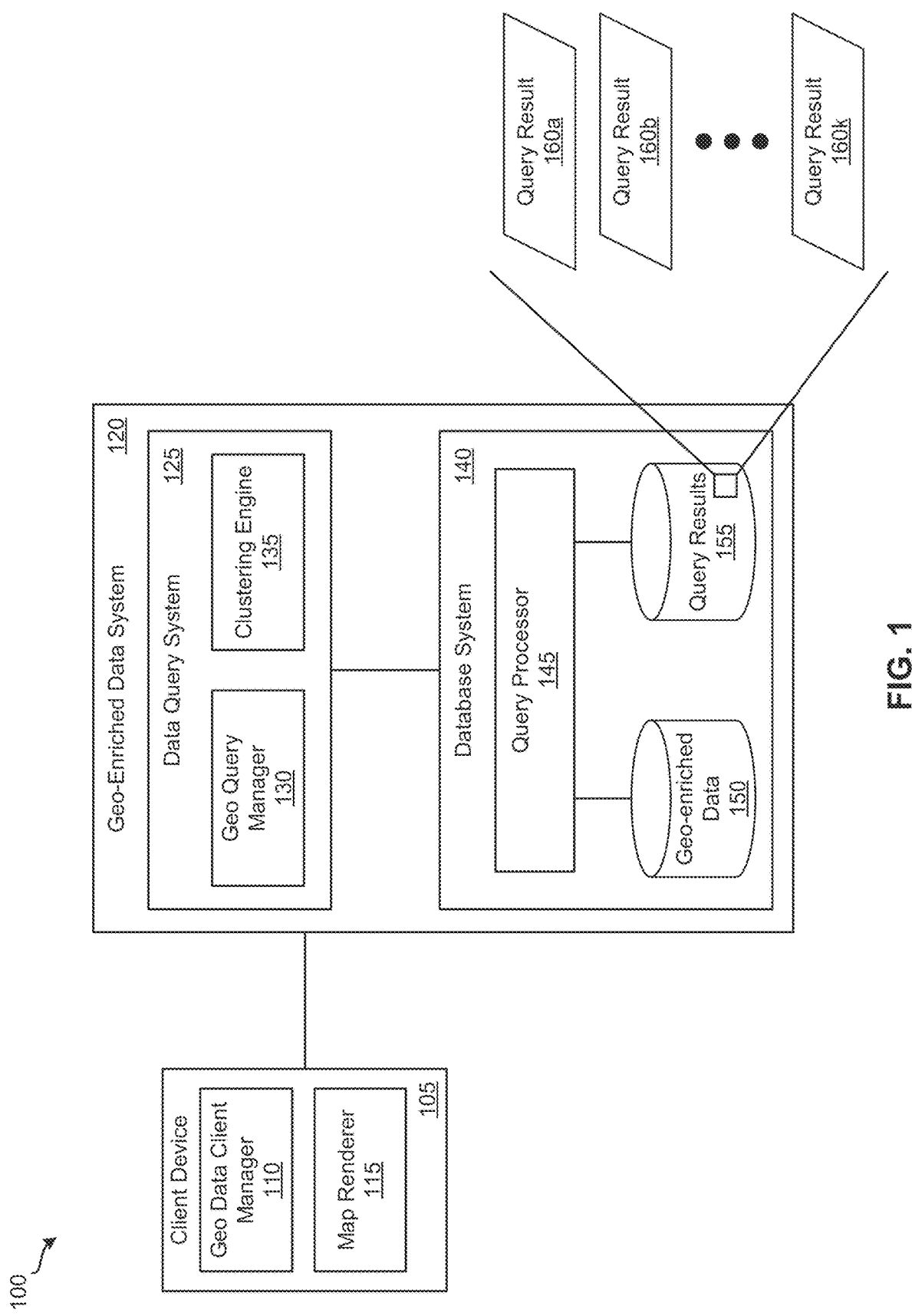
FIG. 1 illustrates a system that includes a geo-enriched data system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system configured to process queries for geo-enriched data based on map extents. In some embodiments, the system receives such a query and a map extent from a client device. The system processes the query to identify geo-enriched data and stores the query results (i.e., the identified geo-enriched data) in the system. Based on the map extent, the system queries the stored query results to identify geo-enriched data that is within the map extent. The system then sends this data to the client device so that the client device may render the map extent on a display of the client device.

Also described herein are techniques implemented on a client device for managing the clustering of geo-enriched data for map extents. In some embodiments, when a map extent is requested to be rendered with clusters of geo-enriched data, the client device sends the system a request for clusters generated from the geo-enriched data. When the client device receives the cluster, the client device identifies clusters that interest with a map extent that is to be rendered. If the number of geo-enriched data represented by the identified clusters is greater than a defined threshold number, the client device renders the map extent with the identified clusters. Otherwise, the client device sends the system another request for geo-enriched data included in the map extent. The client device renders the map extent with such geo-enriched data once the client device receives it from the system.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data. In some embodiments, location data is data that describes a location, area, region, or combination thereof (e.g., a location, area, region, or combination thereof on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

FIG. 1 illustrates a system 100 that includes a geo-enriched data system according to some embodiments. As shown, system 100 includes client device 105 and geo-enriched data system 120. Client device 105 is configured to access and communicate with geo-enriched data system 120 (e.g., via a network). As illustrated, client device 105 includes geo data client manager 110 and map renderer 115. In some embodiments, geo data client manager 110 and map rendered 115 may be implemented in an application (e.g., a web browser) operating on client device 105.

Figure 2:
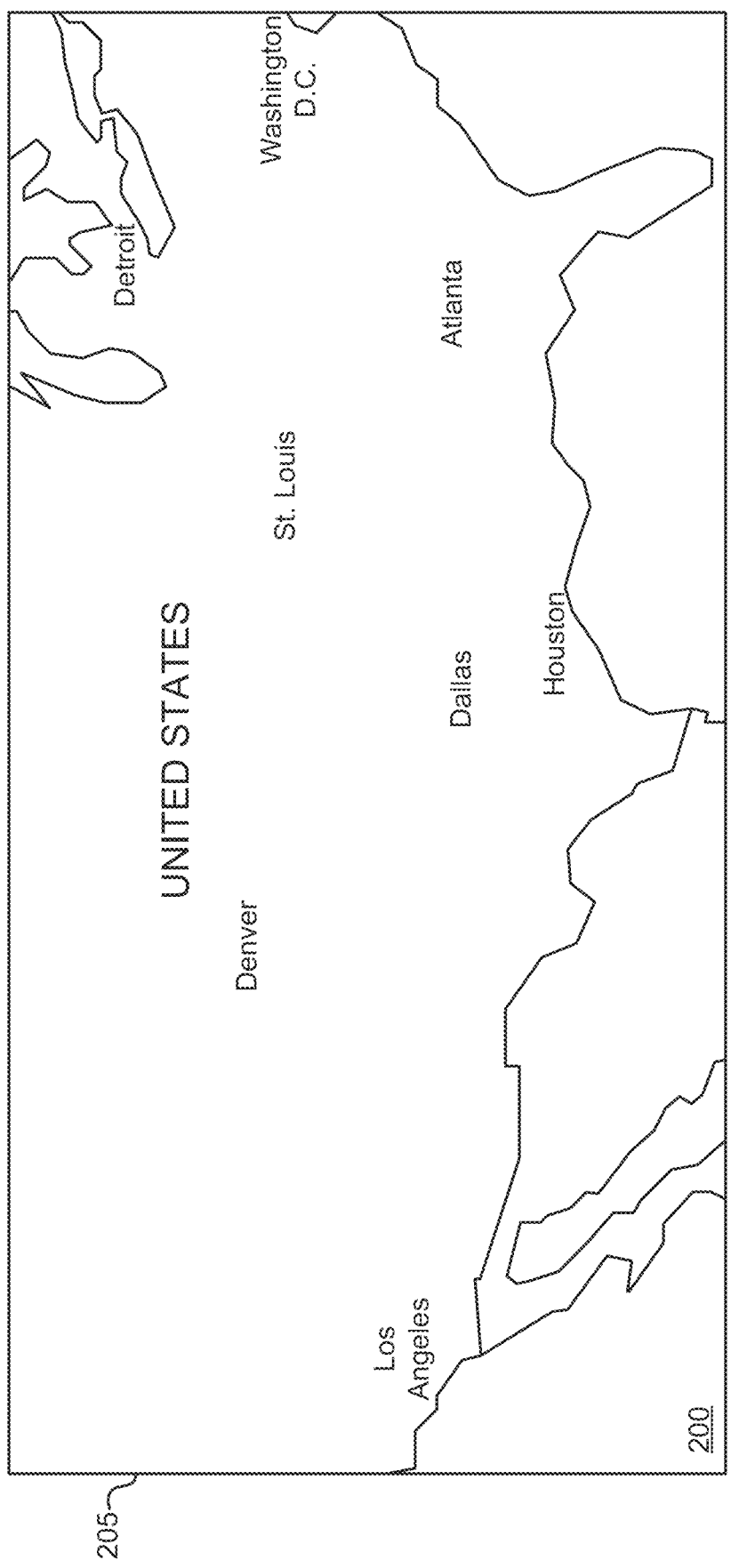
FIG. 2 illustrates an example map visualization that includes a map extent according to some embodiments.
Figure 3:
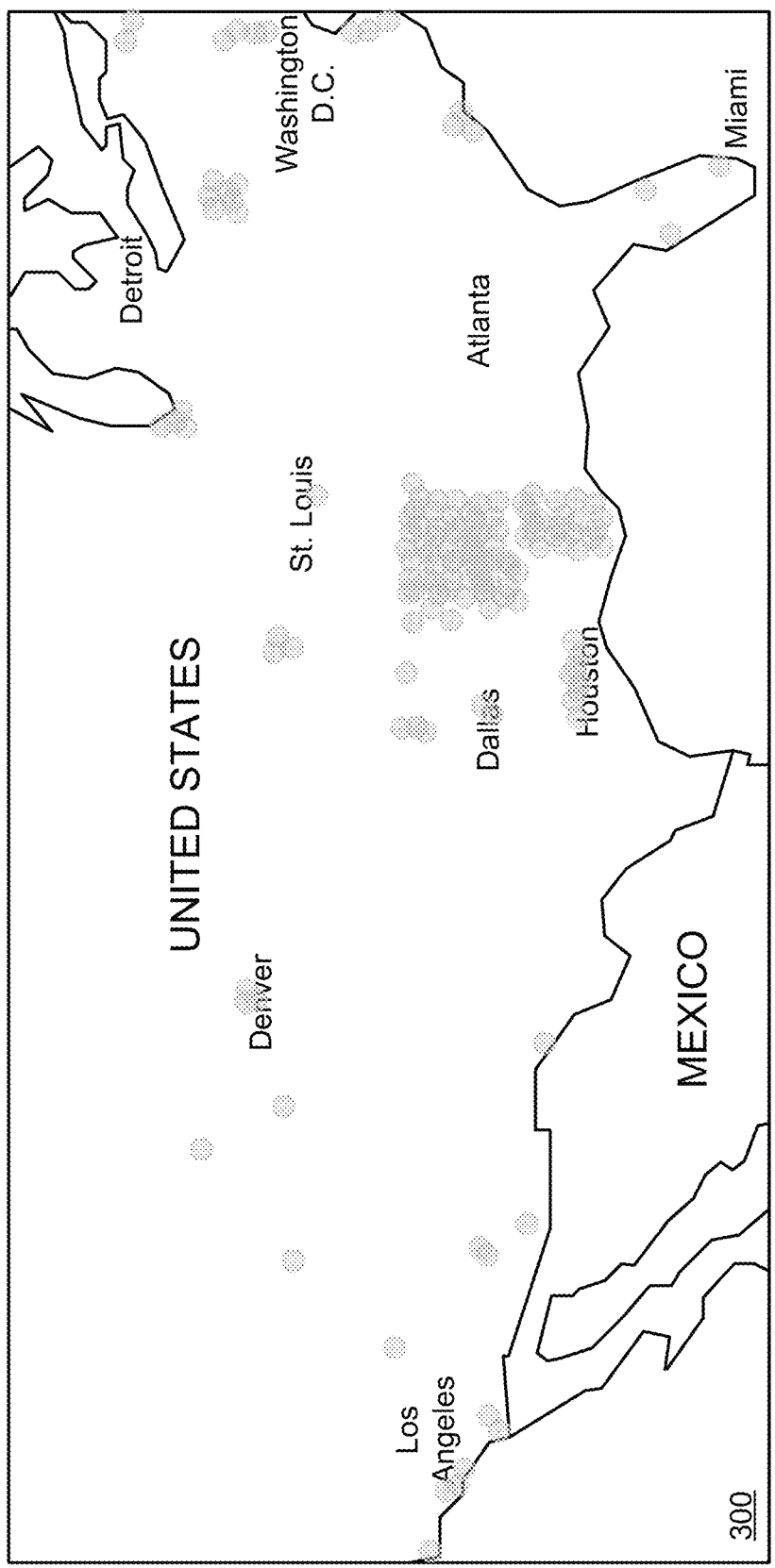
FIG. 3 illustrates an example map visualization that includes geo-enriched data according to some embodiments.

Geo data client manager 110 is configured to manage geo-enriched data for maps. For instance, geo data client manager 110 may send geo-enriched data system 120 a query for geo-enriched data and a map extent. In some embodiments, a map extent is a defined region of a map. The geometry of the map extent may be specified using spatial data (e.g., an ST_polygon, a well-known text (WKT) polygon, etc.) in some such embodiments. FIG. 2 illustrates an example map visualization 200 that includes a map extent according to some embodiments. As illustrated, map visualization 200 includes map extent 205. In this example, map extent 205 defines a rectangular region that includes a large portion of the United States and a portion of Mexico. Upon receiving results from the query for geo-enriched data, geo data client manager 110 sends the geo-enriched data and the map extent to map renderer 115 for rendering. FIG. 3 illustrates an example map visualization that includes geo-enriched data according to some embodiments. In particular, FIG. 3 illustrates map visualization 200 that includes the geographical locations of stores in the United States. The locations of stores are represented by gray circles. Once geo data client manager 110 receives the map extent from map renderer 115, geo data client manager 110 displays the map extent on a display of client device 105.

Figure 4:
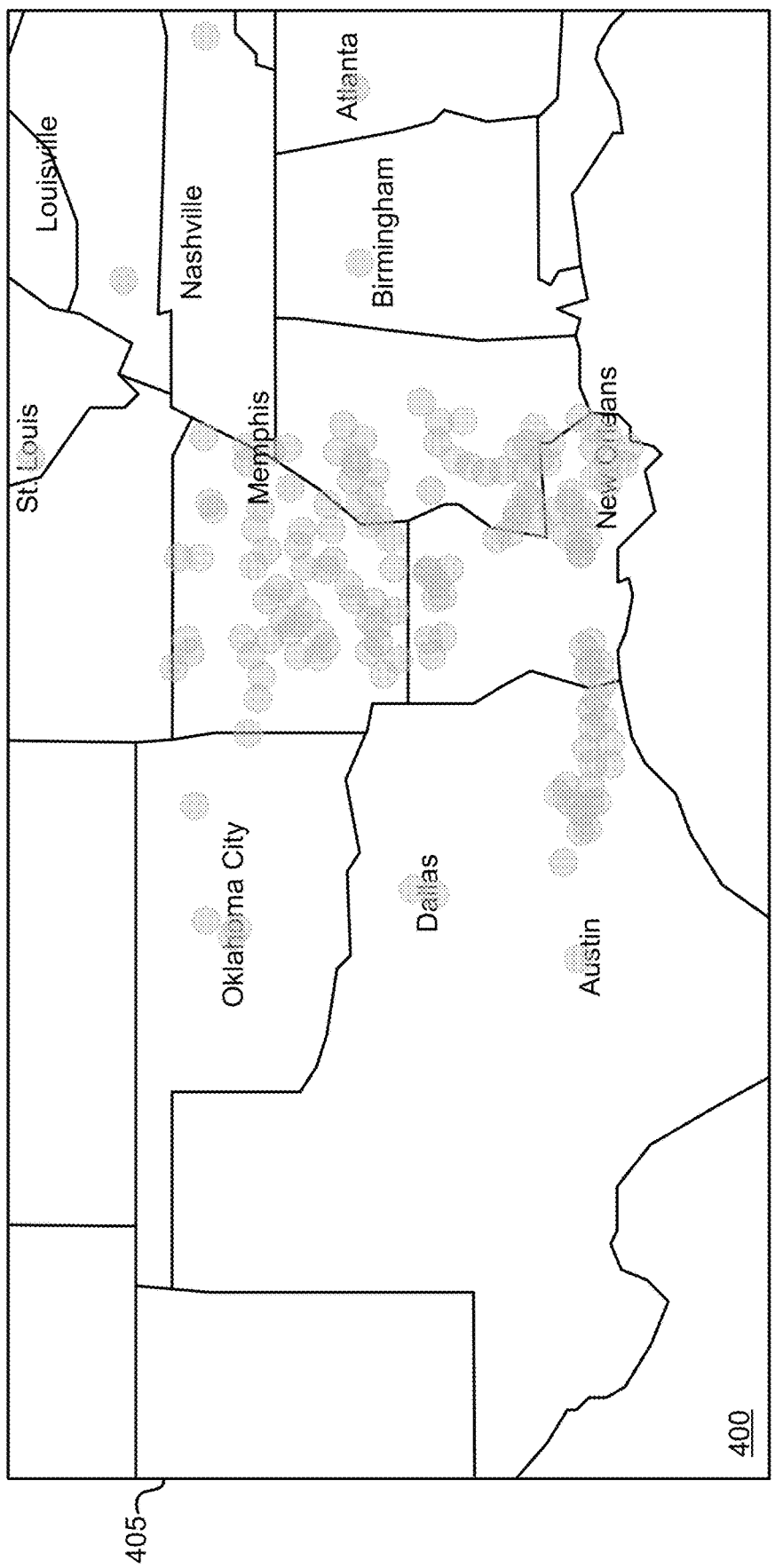
FIG. 4 illustrates a modified view of a map visualization according to some embodiments.

When a view of a map that includes the geo-enriched data is modified (e.g., panning, scrolling, zooming in, zooming out, etc.), geo data client manager 110 sends geo-enriched data system 120 a query for the geo-enriched data along with a map extent of the modified view of the map. After receiving results from geo-enriched data system 120, geo data client manager 110 sends the geo-enriched data and the map extent to map renderer 115 for rendering. As an example, FIG. 4 illustrates a modified view of a map visualization according to some embodiments. Specifically, FIG. 4 shows map visualization 400, which is a zoomed-in view of map visualization 200 illustrated in FIG. 3. As shown, map visualization 400 includes map extent 405, which defines a rectangular region that includes several states in the Southern United States (e.g., Texas, Oklahoma, Louisiana, Arkansas, Alabama, etc.). In addition, map visualization 400 includes the geographical locations of stores, which are represented by gray circles, in the shown portion of the United States.

Figure 5:
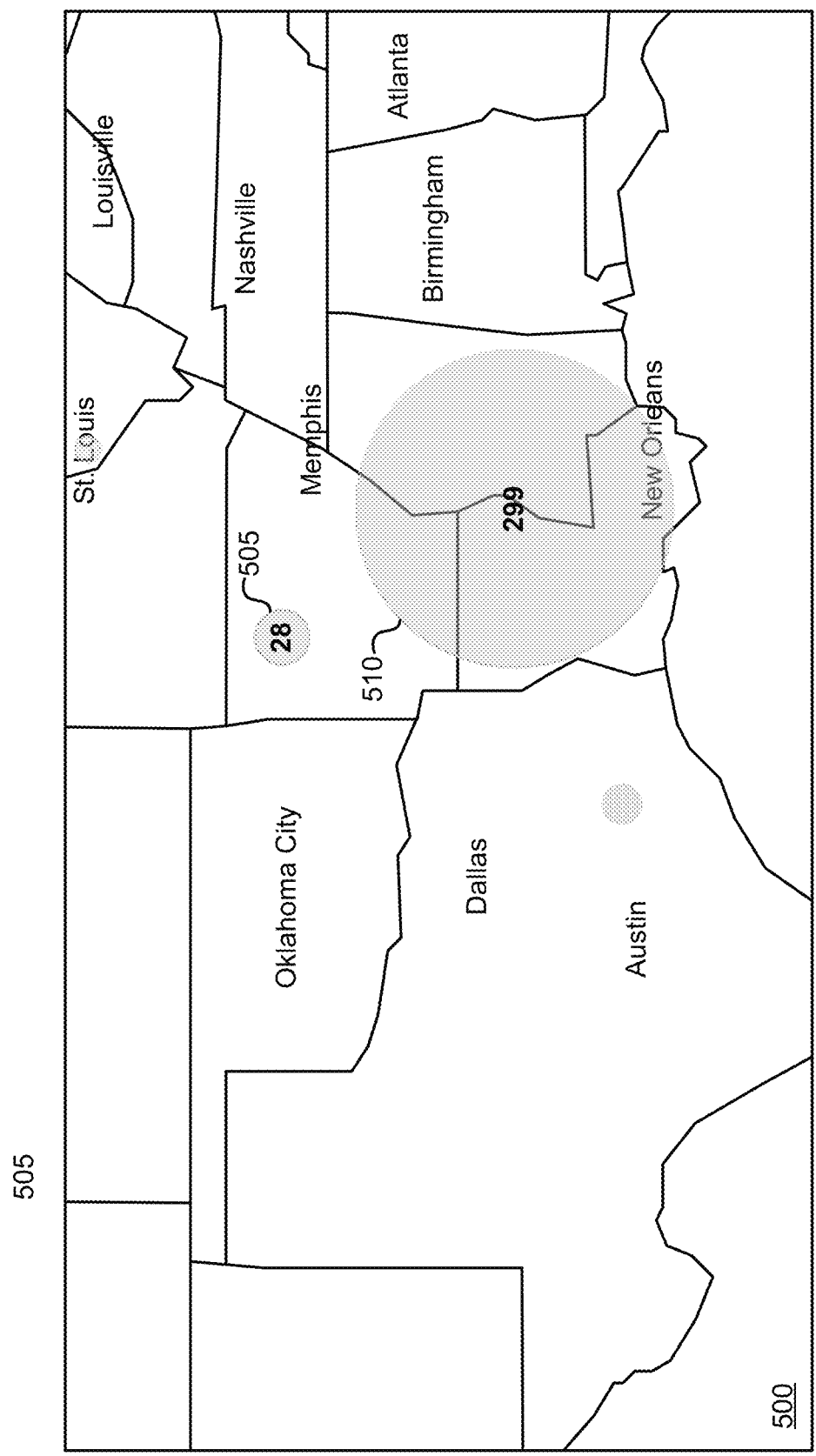
FIG. 5 illustrates an example map visualization that includes clustered geo-enriched data according to some embodiments.

In some embodiments, geo data client manager 110 may send geo-enriched data system 120 a clustering option along with the query and the map extent. The clustering option may specify to cluster geo-enriched data and a threshold number of data points at which to cluster the geo-enriched data. When geo-enriched data is clustered (also referred to as a cluster), the geometries of portions of the geo-enriched data are represented by a single geometry (also referred to as a cluster geometry). The size and/or shape of a cluster geometry may be based on the number of geo-enriched data represented by the cluster geometry (e.g., the size and/or shape may be proportional to the number of geo-enriched data represented by the cluster geometry). As such, the definition of a cluster may include a geometry of the cluster, a size of the geometry, spatial coordinates of the geometry, spatial coordinates of a reference point of the geometry, and a number of geo-enriched data represented by the cluster. In some embodiments, the reference point of a geometry of a cluster is the centroid of the geometry. FIG. 5 illustrates an example map visualization that includes clustered geo-enriched data according to some embodiments. Specifically, FIG. 5 illustrates map visualization 500 that includes clustered geo-enriched data shown in map visualization 400. As shown, various geographical location of stores in the Southern United States are clustered together and represented by clusters 505 and 510.

In some instances, a map extent may include clusters generated from geo-enriched data instead of the geo-enriched data itself. To manage the clusters in some such instances, geo data client manager 110 may send geo-enriched data system 120 a query for clusters generated from geo-enriched data. In some embodiments, such a query may specify a value that represent a maximum number (e.g., 500, 1000, 2500, etc.) of clusters that geo-enriched data system 120 may send back in response to the query. That is, geo data client manager 110 may receive the defined maximum number of clusters or less in response to such a query.

Once geo data client manager 110 receives the clusters from geo-enriched data system 120, geo data client manager 110 identifies clusters in the received clusters that intersect the map extent. Geo data client manager 110 then determines the number of geo-enriched data represented by the identified clusters. If the number of geo-enriched data is greater than a defined threshold number, geo data client manager 110 sends the identified clusters and the map extent to map renderer 115 for rendering. In some embodiments, geo data client manager 110 performs some processing operations on the identified clusters before sending them to map renderer 115. For example, geo data manager 110 may employ a merging technique to merge clusters near and/or overlapping each another together. One such technique is described below by reference to FIGS. 10, 11A, and 11B. If the number of geo-enriched data is not greater than (i.e., less than or equal to) the defined threshold number, geo data client manager 110 sends geo-enriched data system 120 a query for geo-enriched data and the map extent. When geo data client manager 110 receives results from the query for geo-enriched data, geo data client manager 110 sends the geo-enriched data and the map extent to map renderer 115 for rendering. Once geo data client manager 110 receives the map extent from map renderer 115, geo data client manager 110 displays the map extent on the display of client device 105.

As explained above, a view of a map that includes geo-enriched data may be modified (e.g., panning, scrolling, zooming in, zooming out, etc.). When a view of a map that includes clusters generated from geo-enriched data or the geo-enriched data itself is modified, geo data client manager 110 performs operations similar to some of the operations described above. In particular, geo data client manager 110 identifies clusters in the clusters, which geo data client manager 110 received from geo-enriched data system 120, that intersect a map extent of the modified view of the map. Next, geo data client manager 110 determines the number of geo-enriched data represented by the identified clusters. If the number of geo-enriched data is greater than the defined threshold number, geo data client manager 110 sends the identified clusters and the map extent of the modified view of the map to map renderer 115 for rendering. Geo data client manager 110 may perform some processing operations on the identified clusters (e.g. merging the identified clusters) before sending them to map renderer 115. If the number of geo-enriched data is not greater than (i.e., less than or equal to) the defined threshold number, geo data client manager 110 sends geo-enriched data system 120 a query for geo-enriched data and the map extent of the modified view of the map. Once geo data client manager 110 receives results from the query for geo-enriched data, geo data client manager 110 sends the geo-enriched data and the map extent of the modified view of the map to map renderer 115 for rendering. When geo data client manager 110 receives the map extent of the modified view of the map from map renderer 115, geo data client manager 110 displays the map extent on the display of client device 105.

Figure 6:
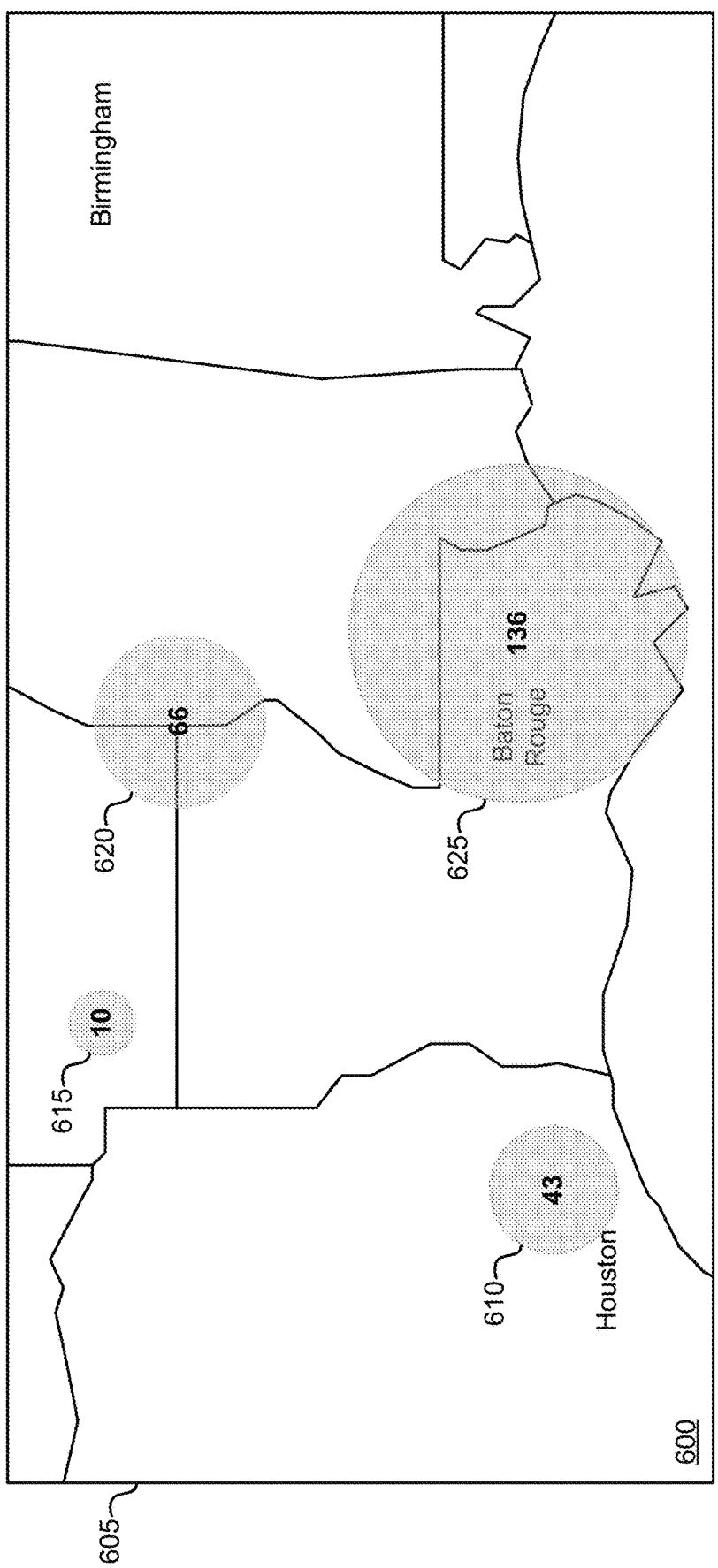
FIG. 6 illustrates sub-clusters of clusters illustrated in FIG. 5 according to some embodiments.

In some embodiments, client device 105 provides a feature for viewing the details of a cluster. For example, when a user of client device 105 causes a user interface (UI) indicator (e.g., a cursor) to hover over a cluster, client device 105 may display the geo-enriched data represented by the cluster. As another example, client device 105 may display the geo-enriched data represented by the cluster when client device 105 performs a zoom operation in response to input (e.g., selecting a zoom option, providing a touch-based pinch gesture, etc.) from a user. In some embodiments, client device 105 displays sub-clusters of the cluster instead of the geo-enriched data represented by the cluster. As an example, FIG. 6 illustrates sub-clusters of clusters illustrated in FIG. 5 according to some embodiments. Specifically, FIG. 6 illustrates map visualization 600, which is displayed after a zoom operation is performed on New Orleans in map visualization 500. As shown, map visualization 600 includes map extent 605, which defines a rectangular region surrounding New Orleans. Map visualization 600 also includes clusters 610-625. Clusters 615-625 are sub-clusters of cluster 510 shown in FIG. 5.

Map renderer 115 is responsible for rendering map extents of maps that include geo-enriched data. For example, map renderer 115 may receive from geo data client manager 110 geo-enriched data, a map extent, and a request to render the map extent that includes the geo-enriched data. In response to the request, map renderer 115 generates the map extent of a map that includes the geo-enriched data. Map renderer 115 then sends geo data client manager 110 the generated map extent. As another example, map renderer 115 can receive from geo data client manager 110 clusters, a map extent, and a request to render the map extent that includes the clusters. In response to the request, map renderer 115 generates the map extent of a map that includes the geo-enriched data. Map renderer 115 then sends geo data client manager 110 the generated map extent.

As explained in further detail below, geo-enriched data may include a set of attributes and different types of visual representations may be associated with different attributes of geo-enriched data. In some cases, when map renderer 115 receives geo-enriched data, a map extent, and a request to render the map extent that includes the geo-enriched data, map renderer 115 may also receive visual representation definitions associated with the geo-enriched data. In some such cases, map renderer 115 generates the map extent of a map that includes the geo-enriched data rendered according to the visual representation definitions. Then, map renderer 115 sends geo data client manager 110 the generated map extent.

As illustrated in FIG. 1, geo-enriched data system 120 includes data query system 125 and database system 140. In some embodiments, data query system 125 and database system 140 are implemented on single computing device while, in other embodiments, data query system 125 and database system 140 are implemented on separate computing devices. Data query system 125 and database system 140 may be implemented on a cloud computing system in some embodiments.

Data query system 125 is configured to handle queries for geo-enriched data from client device 105. As illustrated, data query system 125 includes geo query manager 130 and clustering engine 135. Geo query manager 130 receives queries for geo-enriched data and map extents from client device 105. In some embodiments, when geo query manager 130 receives a query and a map extent from client device 105, geo query manager 130 sends the query to query processor 145 for processing. In return, geo query manager 130 receives from query processor 145 a reference to the results of the query. Geo query manager 130 then sends query processor 145 the reference to the results of the query, the map extent, and a request for geo-enriched data included in the map extent. Geo query manager 130 then receives from query processor 145 a subset of the geo-enriched data stored in the reference to the results of the query that are included in the map extent. Finally, geo query manager 130 sends the subset of the geo-enriched data to client device 105. In other embodiments, when geo query manager 130 receives a query and a map extent from client device 105, geo query manager 130 sends the query and the map extent to query processor 145 for processing. In return, geo query manager 130 receives a set of geo-enriched data included in the map extent. Geo query manager 130 then sends the geo-enriched data to client device 105.

As mentioned above, client device 105 may send, in some embodiments, geo-enriched data system 120 a clustering option, which specifies to cluster geo-enriched data and a threshold number of data points at which to cluster the geo-enriched data, along with a query and a map extent. In some such embodiments, geo query manager 130 sends the subset of the geo-enriched data to clustering engine 135 instead of client device 105. In return, geo query manager 130 may receive from clustering engine 135 spatial clusters that each represents a portion of the subset of the geo-enriched data and any remaining geo-enriched data the subset of the geo-enriched data that was not clustered. In some instances, none of the subset of the geo-enriched data is clustered because the number of data in the subset of the geo-enriched data is less than the threshold number of data points specified in the clustering option. Geo query manager 130 sends the spatial clusters and the remaining geo-enriched data to client device 105.

In some embodiments, geo query manager 130 also handles queries for clusters generated from geo-enriched data. For instance, geo query manager 130 may receive a query for clusters generated from geo-enriched data from client device 105. As mentioned above, the query may specify a value that represent a maximum number of clusters. In response to the query, geo query manager 130 sends a query for the geo-enriched data to query processor 145 for processing. In return, geo query manager 130 receives a set of geo-enriched data. Geo query manager 130 then sends the set of geo-enriched data and the value to clustering engine 135 for clustering. In return, geo query manager 130 receives a set of clusters generated from the set of geo-enriched data. Geo query manager 130 then sends the set of clusters to client device 105.

Clustering engine 135 is configured to cluster geo-enriched data. In some embodiments, clustering engine 135 receives from geo query manager 130 geo-enriched data and a clustering option that specifies whether or not to cluster geo-enriched data and a threshold number of data points at which to cluster the geo-enriched data. Clustering engine 135 determines the number of data in the received geo-enriched data and compares it to the threshold number of data points specified in the clustering option. If the number of data in the received geo-enriched data is less than the threshold number of data points specified in the clustering option, clustering engine 135 does not perform any clustering on the geo-enriched data and sends geo query manager 130 a notification indicating so. Otherwise, clustering engine 135 performs a clustering technique on the geo-enriched data. Clustering engine 135 utilizes any number of different clustering techniques in different embodiments. For instance, in some embodiments, clustering engine 135 uses a grid-based clustering technique. In other embodiments, clustering engine 135 may use a k-means clustering technique. After clustering the geo-enriched data, clustering engine 135 sends the clustered geo-enriched data to geo query manager 130.

In some embodiments, clustering engine 135 can receive a set of geo-enriched data and a value that represent a maximum number of clusters from geo query manager 130. In response, clustering engine 135 generates a set of clusters using any one of the techniques mentioned above. The number of clusters in the set of clusters is less than or equal to the value. Then, clustering engine 135 sends the generated set of clusters to geo query manager 130.

Database system 140 is responsible for managing geo-enriched data stored in database system 140. As shown, database system 140 includes query processor 145, geo-enriched data storage 150, and query results storage 155. Geo-enriched data storage 150 is configured to store geo-enriched data. Query results storage 155 is configured to store results of queries for geo-enriched data stored in geo-enriched data storage 150. In some embodiments, storages 150 and 155 are implemented in a single physical storage while, in other embodiments, storages 150 and 155 may be implemented across several physical storages. While FIG. 1 shows storages 150 and 155 included in database system 140, one of ordinary skill in the art will appreciated that storages 150 and/or 155 may be external to database system 140 in some embodiments.

Query processor 145 processes queries received from geo query manager 130. For instance, when query processor 145 receives a query (e.g., a structured query language (SQL) query) for geo-enriched data from geo query manager 130, query processor 145 accesses geo-enriched data storage 150 and identifies geo-enriched data based on the query. Next, query processor 145 stores the query results (i.e., the identified geo-enriched data) in query results storage 155 for later use. Query processor 145 then sends geo query manager 130 a notification that the query has been processed as well as a reference to the stored query results (e.g., a name of a of table in query results storage 155 that stores the query results). Query processor 145 stores different query results in query results storage 155 for different queries. As shown in FIG. 1, query results storage 155 stores different query results 160*a-k* in this example. If query processor 145 receives a query from geo query manager 130 that already has results stored in query results storage 155, query processor 145 does not process the query again. Instead, query processor 145 sends geo query manager 130 the reference to the stored query results.

In some embodiments, query processor 145 may receive a reference to results of a query stored in query results storage 155, a map extent, and a request for geo-enriched data included in the map extent. To process the request, query processor 145 performs a spatial operation on the geo-enriched data stored in the reference to the results of the query and the map extent. In some embodiments, the spatial operation determines a subset of the geo-enriched data stored in the reference to the results of the query that are contained in the geometry of the map extent. Query processor 145 then sends the subset of the geo-enriched data to geo query manager 130.

In addition, query processor 145 can receive a query for geo-enriched data that is included in a map extent from geo query manager 130. Query processor 145 processes such a query by identifying geo-enriched data stored in geo-enriched data storage 150 specified in the query and performing a spatial operation on the identified geo-enriched data and the map extent. In some embodiments, the spatial operation determines a subset of the identified geo-enriched data that are contained in the geometry of the map extent. Query processor 145 then sends the subset of the geo-enriched data to geo query manager 130.

FIG. 1 illustrates a system that includes a client device and a geo-enriched data system. One of ordinary skill in the art will understand that the system may include any number of additional client devices that are configured to interact with the geo-enriched data system in the same or similar manner as that described above by reference to client device 105.

Figure 7:
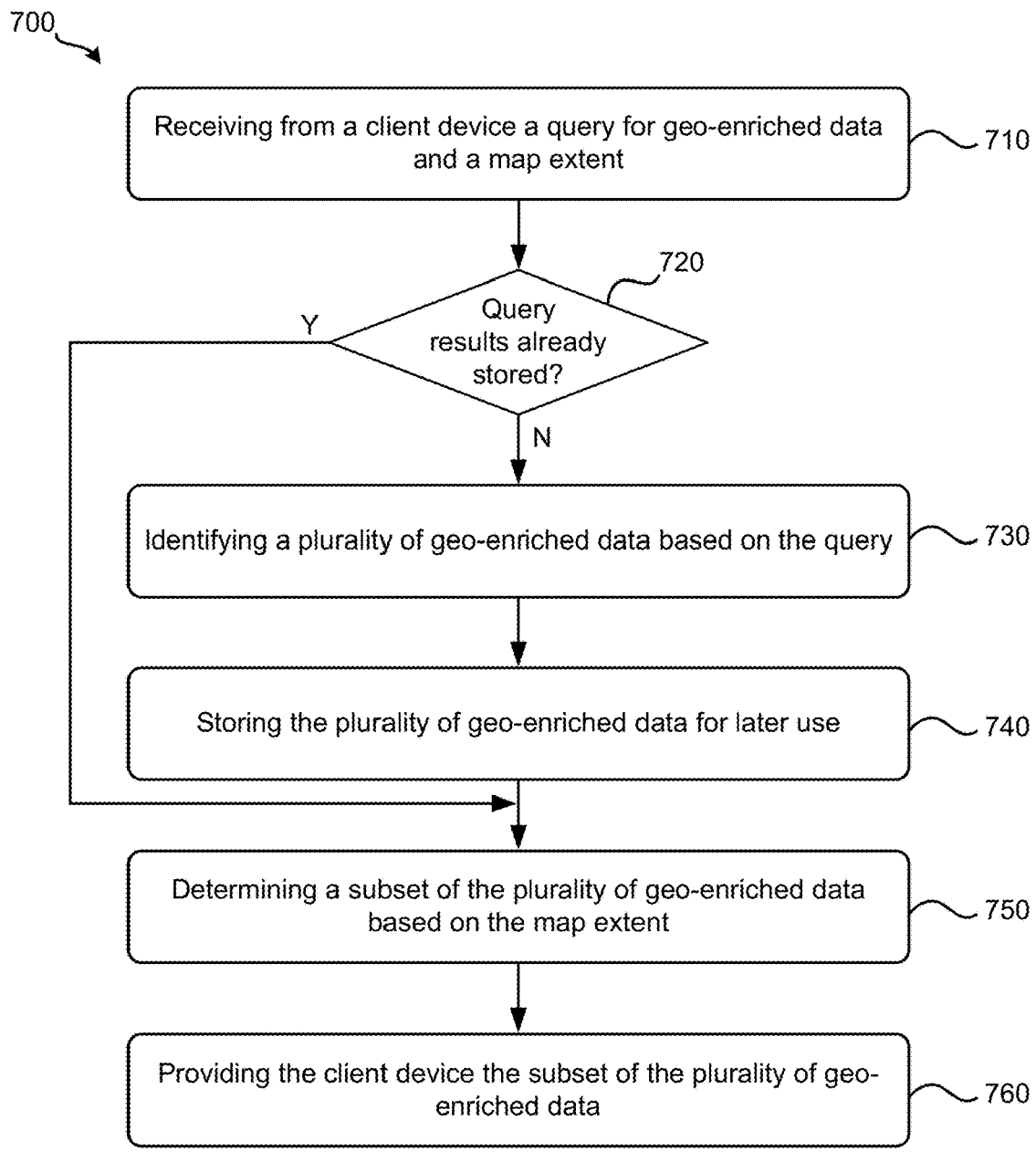
FIG. 7 illustrates a process for providing geo-enriched data for a map extent according to some embodiments.

FIG. 7 illustrates a process 700 for providing geo-enriched data for a map extent according to some embodiments. In some embodiments, geo-enriched data system 120 performs process 700. Process 700 starts by receiving, at 710, from a client device (e.g., client device 105) a query for geo-enriched data and a map extent. In some embodiments, process 700 may also receive from the client device a clustering option that specifies to cluster the geo-enriched data and a threshold number of data points at which to cluster the geo-enriched data.

Next, process 700 determines, at 720, whether query results for the query are already stored. As described above, when query processor 145 receives a query from geo query manager 130 that already has results stored in query results storage 155, query processor 145 does not process the query again. As such, when process 700 determines that the query results for the query are already stored, process 700 proceeds to operation 750. Otherwise, process 700 continues to operation 730.

At 730, process 700 identifies a plurality of geo-enriched data based on the query. In some embodiments, process 700 identifies the plurality of geo-enriched data by accessing geo-enriched data storage 150 and retrieving the plurality of geo-enriched data. Process 700 then stores, at 740, the plurality of geo-enriched data for later use. In some embodiments, process 700 stores the plurality of geo-enriched data in query results storage 155.

Next, process 700 identifies, at 750, a subset of the plurality of geo-enriched data based on the map extent. In some embodiments, process 700 identifies the subset of the plurality of geo-enriched data by performing a spatial operation that determines geo-enriched data that are contained in the geometry of the map extent. As explained above, process 700 may also receive from the client device a clustering option that specifies to cluster the geo-enriched data and a threshold number of data points at which to cluster the geo-enriched data in some embodiments. In some such embodiments, process 700 determines the number of data in the subset of the plurality of geo-enriched data and compares it to the threshold number of data points specified in the clustering option. If the number of data in the subset of the plurality of geo-enriched data is less than the threshold number of data points specified in the clustering option, process 700 does not perform any clustering on the subset of the plurality of geo-enriched data. If the number of data in the subset of the plurality of geo-enriched data is greater than or equal to the threshold number of data points specified in the clustering option, process 700 performs a clustering technique on the subset of the plurality of geo-enriched data.

Finally, process 700 provides, at 760, the client device the subset of the plurality of geo-enriched data so the client device may render the map extent of a map that includes the subset of the plurality of geo-enriched data. If the subset of the plurality of geo-enriched data has been clustered, process 700 provides the client device the clustered geo-enriched data and any remaining geo-enriched data that is not clustered.

In some embodiments, geo-enriched data system 120 may not store query results in database system 140. Rather, when geo-enriched data system 120 receives a query for geo-enriched data from client device 105 in some such embodiments, geo query manager 130 sends the query to database system 140 for processing, database system 140 returns the query results to geo query manager 130, and geo query manager 130 sends client device 105 the query results. That is, geo-enriched data system 120 provides client device 105 all of the geo-enriched data in the query results instead of just the geo-enriched data in the query results that are included in a map extent. When client device 105 receives the query results, map renderer 115 renders a map that includes the geo-enriched data in the query results and displays a map extent of the map.

In some embodiments where geo-enriched data system 120 provides client device 105 all of the geo-enriched data in the query results, the clustering operations described above are implemented on client device 105 instead of geo-enriched data system 120. In some such embodiments, client device 105 includes a clustering engine that implements the same or similar functions described above by reference to clustering engine 135. If a clustering option is enabled, client device 105 clusters the geo-enriched data in the same or similar manner described above and map renderer 115 renders a map that includes the clustered geo-enriched data and any remaining geo-enriched data that is not clustered and displays a map extent of the map.

Figure 8:
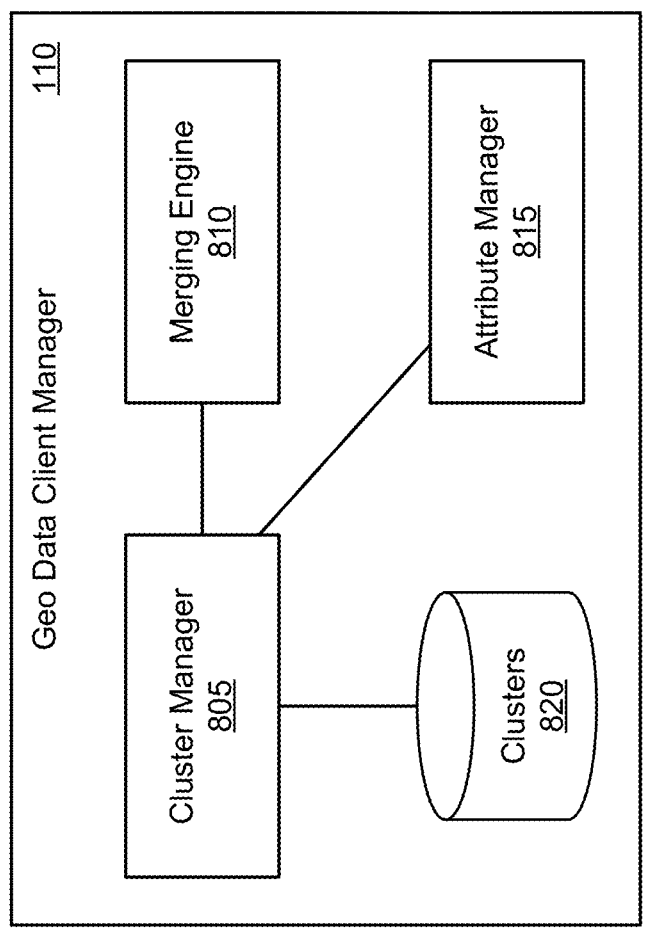
FIG. 8 illustrates a geo data client manager according to some embodiments.

FIG. 8 illustrates a geo data client manager 110 according to some embodiments. As shown, geo data client manager 110 includes cluster manager 805, merging engine 810, attribute manager 815, and clusters storage 820. Clusters storage 820 is configured to store clusters generated from geo-enriched data. Cluster manager 805 is responsible for managing clusters for map extents. When cluster manager 805 receives an initial request for a map extent that includes clusters generated from geo-enriched data, cluster manager 805 can send geo-enriched data system 120 a query for clusters generated from geo-enriched data. As described above, such a query may, in some embodiments, specify a value that represent a maximum number of clusters that geo-enriched data system 120 may send back in response to the query. In some embodiments, cluster manager 805 also sends geo-enriched data system 120 a request for one or more maximum values of one or more attributes in the geo-enriched data and one or more minimum values of the one or more attribute in the geo-enriched data when cluster manager 805 receives the initial request for the map extent.

Upon receiving the clusters from geo-enriched data system 120, cluster manager 805 stores them in clusters storage 820. Then cluster manager 805 identifies clusters in the received clusters that intersect the map extent. Next, cluster manager 805 determines the number of geo-enriched data represented by the identified clusters. If the number of geo-enriched data is greater than a defined threshold number, cluster manager 805 sends the identified clusters and the map extent to merging engine 810 for merging. In return, cluster manager 805 receives a set of cluster groups from merging engine 810. Cluster manager 805 sends the set of cluster groups and the map extent to map renderer 115 for rendering. If the number of geo-enriched data is not greater than (i.e., less than or equal to) the defined threshold number, cluster manager 805 sends geo-enriched data system 120 a query for geo-enriched data and the map extent. Upon receiving results from the query for geo-enriched data, cluster manager 805 sends the geo-enriched data, the one or more maximum values of one or more attributes in the geo-enriched data, and the one or more minimum values of the one or more attributes in the geo-enriched data to attribute manager 815 for processing. In return, cluster manager 805 may receive the processed geo-enriched data and visual representation definitions associated with the geo-enriched data from attribute manager 815. Then, cluster manager 805 sends the processed geo-enriched data, the map extent, and the visual representation definitions to map renderer 115 for rendering. Upon receiving the map extent from map renderer 115, cluster manager 805 displays the map extent on the display of client device 105.

In some instances, a view of a map that includes geo-enriched data may be modified (e.g., panning, scrolling, zooming in, zooming out, etc.). When a view of a map that includes clusters generated from geo-enriched data or the geo-enriched data itself is modified, cluster manager 805 retrieves the clusters generated from the geo-enriched data stored in clusters 820. Cluster manager 805 then identifies clusters in the retrieved clusters that intersect a map extent of the modified view of the map. Next, cluster manager 805 determines the number of geo-enriched data represented by the identified clusters. If the number of geo-enriched data is greater than the defined threshold number, cluster manager 805 sends the identified clusters and the map extent of the modified view of the map to merging engine 810 for merging. Once cluster manager 805 receives a set of cluster groups from merging engine 810, cluster manager 805 sends the set of cluster groups and the map extent of the modified view of the map to map renderer 115 for rendering. If the number of geo-enriched data is not greater than (i.e., less than or equal to) the defined threshold number, cluster manager 805 sends geo-enriched data system 120 a query for geo-enriched data and the map extent of the modified view of the map. Once cluster manager 805 receives results from the query for geo-enriched data, cluster manager 805 sends the geo-enriched data to attribute manager 815 for processing. After receiving the processed geo-enriched data from attribute manager 815, cluster manager 805 sends the processed geo-enriched data and the map extent of the modified view of the map to map renderer 115 for rendering. When cluster manager 805 receives the map extent of the modified view of the map from map renderer 115, cluster manager 805 displays the map extent on the display of client device 105.

Figure 9:
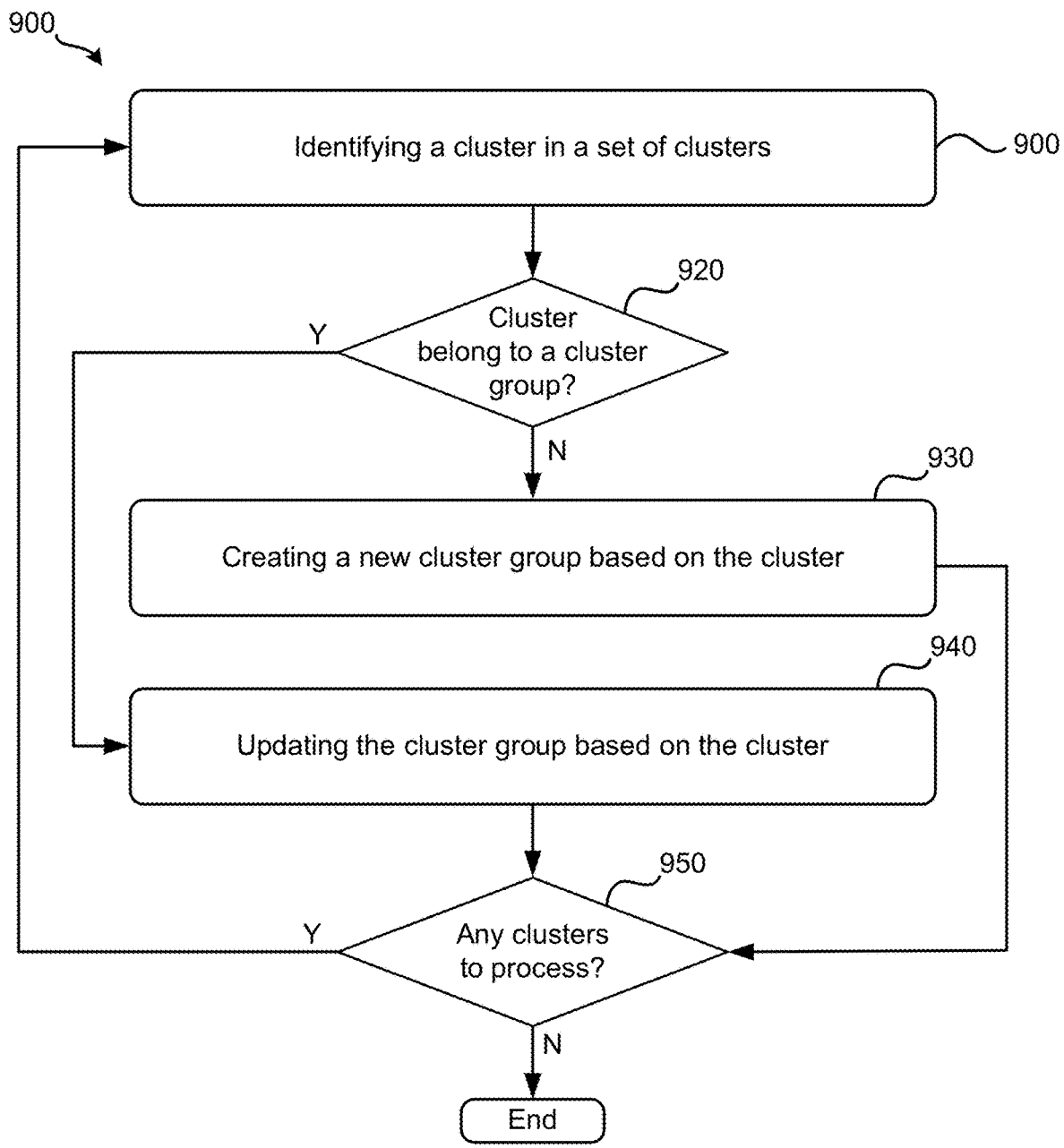
FIG. 9 illustrates a process for merging clusters according to some embodiments.

Merging engine 810 is configured to perform merging operations on sets of clusters received from cluster manager 805. In some embodiments, when merging engine 810 receives a set of clusters and a map extent from cluster manager 805, merging engine 810 applies a merging technique to the set of clusters. An example merging technique will now be described by reference to FIG. 9. FIG. 9 illustrates a process 900 for merging clusters according to some embodiments. In some embodiments, merging engine 810 performs process 900 when merging engine 810 receives a set of clusters from cluster manager 805. Process 900 starts by identifying, at 910, a cluster in the set of clusters.

Next, process 900 determines, at 920, whether the cluster belongs to a cluster group. In some embodiments, a cluster group is a single geometry that represents one or more clusters. In other words, the one or more clusters are merged into a cluster group. The definition of a cluster group may include a geometry of the cluster group, a size of the geometry, spatial coordinates of the geometry, spatial coordinates of a reference point of the geometry, and a number of geo-enriched data represented by the cluster group. In some embodiments, process 900 determines whether the cluster belongs to a particular cluster group by determining a distance between the reference point of the geometry of the cluster and the reference point of the geometry of the particular cluster group in terms of pixels. Process 900 may determine such a distance by calculating a spatial distance (e.g., in meters) between the reference point of the geometry of the cluster and the reference point of the geometry of the particular cluster group based on the spatial coordinates of the reference points, determining the map resolution (e.g., in meters per pixel) of the map extent of the map, and then dividing the spatial distance by the map resolution. If the determined distance is less than or equal a defined threshold pixel distance (e.g., 50 pixel, 100 pixels, 200 pixels, etc.), process 900 determines that the cluster belongs to the particular cluster group and proceeds to operation 940.

If process 900 determines that the cluster does not belong to any cluster groups (e.g., the cluster is the first identified cluster in the set of clusters), process 900 creates, at 930, a new cluster group based on the cluster. In some embodiments, process 900 creates the new cluster group by assigning attributes of the cluster to the new cluster group. That is, process 900 uses the definition of the cluster (e.g., the geometry of the cluster, the size of the geometry, the spatial coordinates of the geometry, the spatial coordinates of a reference point of the geometry, and the number of geo-enriched data represented by the cluster are used as the respective attributes of the cluster group) as the definition of the cluster group. After creating the new cluster group, process 900 adds the collection of existing (if any) cluster groups and then proceeds to operation 950.

At 940, process 900 updates, based on the cluster, the cluster group to which the cluster is determined to belong. Process 900 may update the cluster group by modifying attributes of the cluster group based on the attributes of the cluster. In some embodiments, process 900 uses the following equations to update the cluster group:

$$CG_x = \frac{CG_x \times CG_s + C_x \times C_s}{CG_s + C_s}$$

$$CG_y = \frac{CG_y \times CG_s + C_y \times C_s}{CG_s + C_s}$$

$$CG_s = CG_s + C_s$$

$$CG_n = CG_n + C_n$$

where $CG_x$ is the x coordinate of the reference point of the cluster group, $CG_y$ is the y coordinate of the reference point of the cluster group, $CG_s$ is the size of the geometry (e.g. area) of the cluster group, $CG_n$ is the number of geo-enriched data represented by the cluster group, $C_x$ is the x coordinate of the reference point of the cluster, $C_y$ is the y coordinate of the reference point of the cluster, $C_s$ is the size of the geometry (e.g. area) of the cluster, and $C_n$ is the number of geo-enriched data represented by the cluster.

Process 900 then determines, at 950, whether any clusters in the set of clusters are left to process. If so, process 900 returns to operation 900 to continue processing clusters in the set of clusters. Otherwise, process 900 ends. FIG. 900 illustrates a technique for merging clusters. In some embodiments, the same or similar technique may be used to merge cluster groups into another set of cluster groups. In some such embodiments, the technique may be repeated a defined number of times. In other such embodiments, the technique can be repeated until the cluster group resulting from the merging technique is the same as the cluster group used at the start of the merging. After merging engine 810 finishes merging the set of cluster into a set cluster groups, merging engine 810 sends the set of cluster groups to cluster manager 805.

Figure 10A:
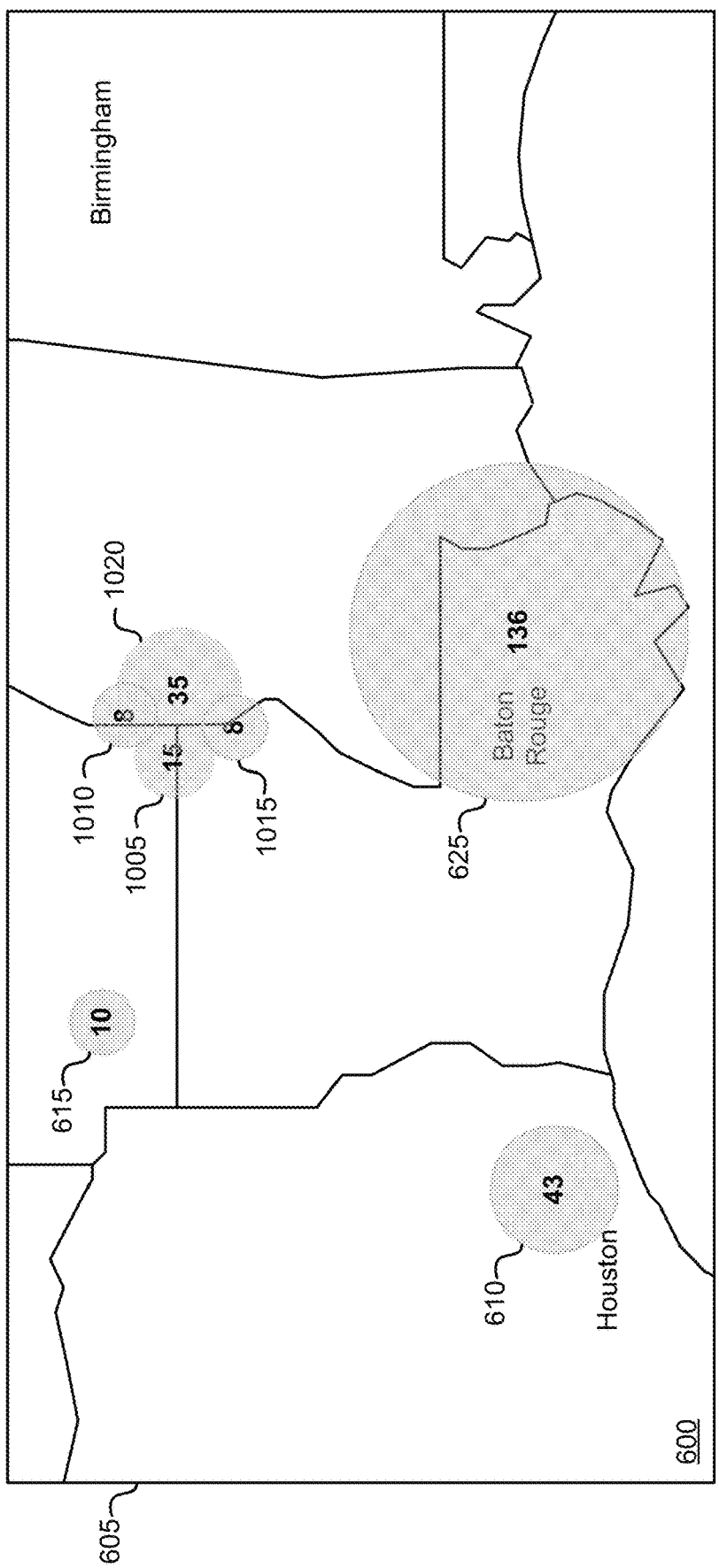
FIGS. 10A and 10B illustrate an example of cluster merging for a map visualization that includes clustered geo-enriched data according to some embodiments.
Figure 10B:
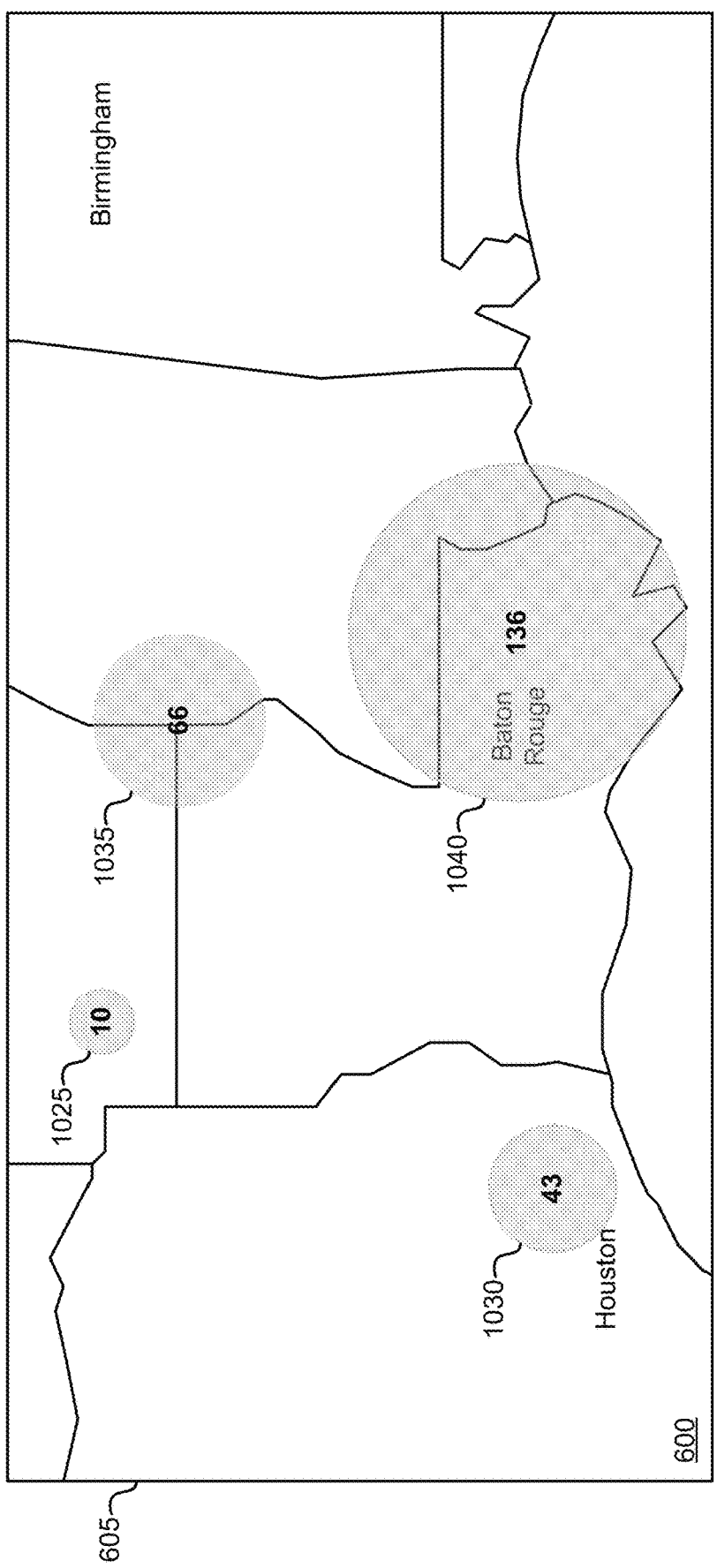

FIGS. 10A and 10B illustrate an example of cluster merging for a map visualization that includes clustered geo-enriched data according to some embodiments. Specifically, FIG. 10A illustrates a map visualization 600 without clusters merged FIG. 10A is similar to FIG. 6 except map visualization 600 includes clusters 1005-1020 instead of cluster 620. As shown in FIG. 10A, clusters 1005-1020 are positioned close to and/or overlapping each other. FIG. 10B illustrates map visualization 600 with clusters merged using the technique described above by reference to FIG. 9. As shown in FIG. 10B, map visualization 600 includes cluster groups 1025-1040. Cluster groups 1025, 1030, and 1040 are the same as clusters 615, 610, and 625, respectively, as they are not positioned close to and/or overlapping each other. Clusters 1005-1020 in FIG. 10A have been merged as cluster group 1035 since clusters 1005-1020 were positioned close to and/or overlapping each other.

Attribute manager 815 is responsible for handling the visual representations of geo-enriched data based on attributes of the geo-enriched data. Attribute manager 815 may receive geo-enriched data, one or more maximum values of one or more attributes in the geo-enriched data, and one or more minimum values of the one or more attributes in the geo-enriched data from cluster manager 805.

In some embodiments, geo-enriched data may include a set of attributes. For example, geo-enriched data may be store sales data that includes attributes such as a location of a store, an amount of revenue associated with the store, a number of sales associated with the store, etc. Different types of visual representations may be associated with different attributes of geo-enriched data. Continuing with the example, the amount of revenue may be associated with the size of the visual representation of the geo-enriched data and/or the number of sales may be associated with the color of the visual representation of the geo-enriched data.

In order to accurately render the visual representation associated with an attribute of the geo-enriched data, attribute manager 815 defines the visual representation of each geo-enriched data in the geo-enriched data based on the value of the attribute of the geo-enriched data, the maximum value, and the minimum value. For instance, different colors may be associated with different values in the range between minimum value and the maximum value. In this example, attribute manager 815 may define the color for the visual representation of a particular geo-enriched data as the color associated with the value in the range that is equal to the value of the attribute of the particular geo-enriched data. In this fashion, the color defined attribute manager 815 defines the color for the visual representations of geo-enriched data according to the range of values of the attribute of the entire set of geo-enriched data (as opposed to the range of values of the attribute of geo-enriched data included in a map extent). One of ordinary skill in the art will understand that the attributes and the types of visual representations described above are examples used for the purposes of simplicity and explanation. Additional and/or different attributes may be associated with additional and/or different types of visual representations of geo-enriched data in some embodiments.

When attribute manager 815 receives the geo-enriched data, one or more maximum values, and the one or more minimum values from cluster manager 805, attribute manager 815 defines visual representations of the geo-enriched data in the manner described in the examples above for each attribute in the one or more attributes of the geo-enriched data. Then, attribute manager 815 sends the visual representation definitions to cluster manager 805.

Figure 11:
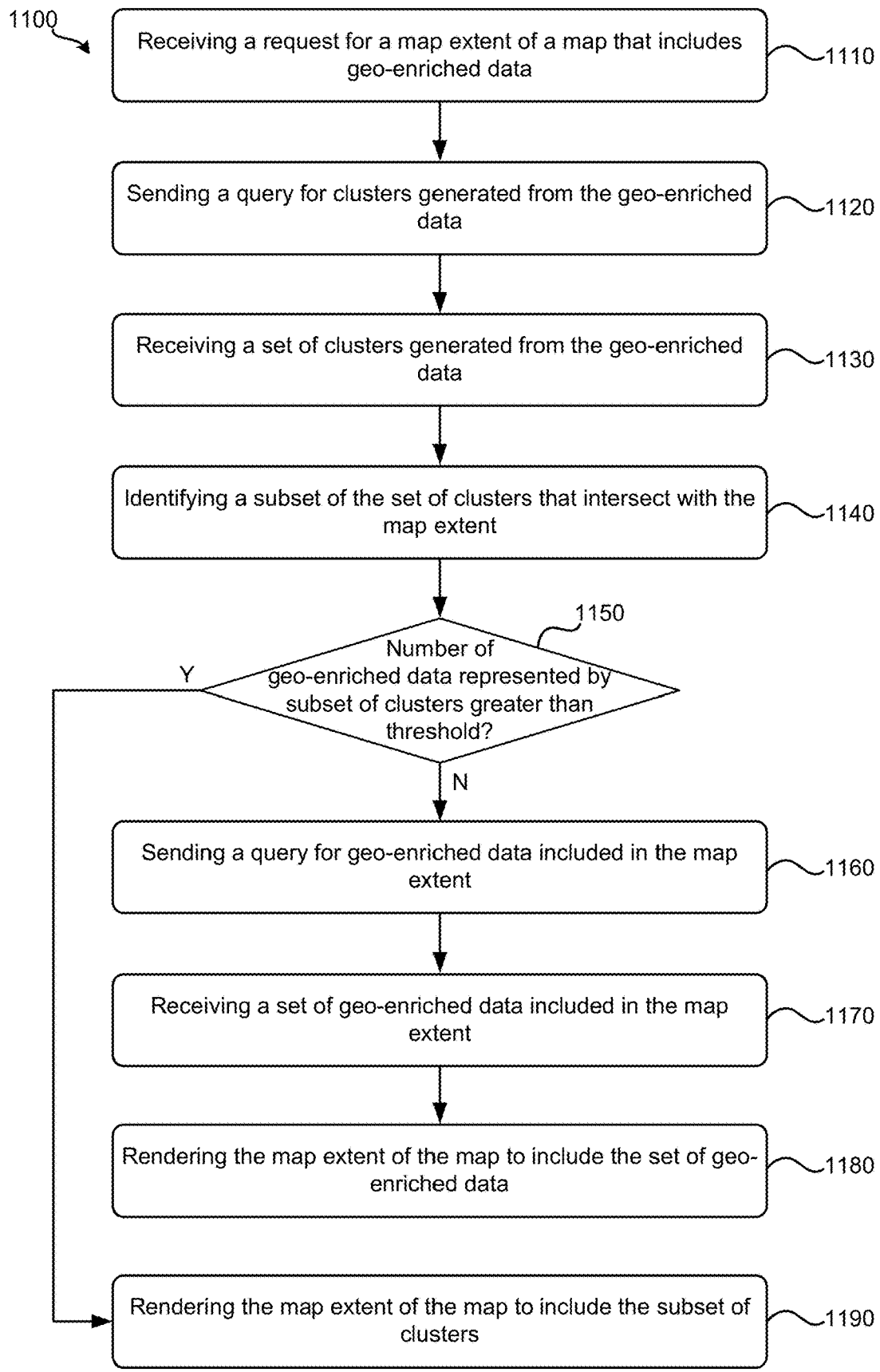
FIG. 11 illustrates a process for providing geo-enriched data for a map extent according to some embodiments.

FIG. 11 illustrates a process 1100 for providing geo-enriched data for a map extent according to some embodiments. In some embodiments, client device 105 performs process 1100. Process 1100 begins by receiving, at 1110, a request for a map extent of a map that include geo-enriched data. In response, process 1100 sends, at 1120, a query for clusters generated from the geo-enriched data. Referring to FIG. 1 as an example, client device 105 may send the query to geo-enriched data system 120. The query may specify a value that represent a maximum number of clusters that geo-enriched data system 120 may send back in response to the query. In some embodiments, process 1100 also sends geo-enriched data system 120 a request for one or more maximum values of one or more attributes in the geo-enriched data and one or more minimum values of the one or more attribute in the geo-enriched data when cluster manager 805 receives an initial request for the map extent (as opposed to a request for a modified view of a map extent).

Next, process 1100 receives, at 1130, a set of cluster generated from the geo-enriched data. Referring to FIG. 1 as an example, client device 105 can receive the set of clusters generated from the geo-enriched data system 120. In some embodiments, client device 105 may store the set of clusters in a storage (e.g., clusters storage 820) for later use. Process 1100 then identifies, at 1140, a subset of the set of clusters that intersect with the map extent. Next, process 1100 determines, at 1150, whether the number of geo-enriched data represented by the identified subset of the set of clusters is greater than a threshold number. If so, process 1100 proceeds to operation 1190. Otherwise, process 1100 sends, at 1160, a query for geo-enriched data included in the map extent. In some embodiments, process 1100 sends a query for the geo-enriched data and the map extent. Referring to FIG. 1 as an example, client device 105 may send the query and the map extent to geo-enriched data system 120.

Process 1100 then receives, at 1170, a set of geo-enriched data that is included in the map extent. Referring to FIG. 1 as an example, client device 105 can receive the set of geo-enriched data from geo-enriched data system 120. In some embodiments, process 1100 defines visual representation associated with the geo-enriched data based on attributes of the set of geo-enriched data, the one or more maximum values of one or more attributes in the geo-enriched data, and the one or more minimum values of the one or more attributes in the geo-enriched data. Next, process 1100 renders, at 1180, the map extent of the map to include the set of geo-enriched data. In some embodiments, process 1100 renders the map extent based on visual representation definitions associated with the set of geo-enriched data. After rendering, process 1100 may display the rendered map extent. Referring to FIG. 1 as an example, client device 105 may display the map extent on the display of client device 105. Process 1100 then ends.

At operation 1190, process 1100 renders the map extent of the map to include the subset of clusters. After process 1100 renders the map extent, process 1100 can display the rendered map extent. Referring to FIG. 1 as an example, client device 105 may display the map extent on the display of client device 105. Process 1100 then ends. In some embodiments, process 1100 employs the merging techniques described above on the subset of clusters before performing operation 1190. In some such embodiments, process 1100 renders the map extent of the map to include a set of cluster groups that resulted from the merging the subset of clusters.

As described above, in some cases, a view of a map that includes geo-enriched data may be modified (e.g., panning, scrolling, zooming in, zooming out, etc.). When a view of a map that includes clusters generated from geo-enriched data or the geo-enriched data itself is modified, client device 105 may retrieve the clusters generated from the geo-enriched data stored in clusters 820 and then perform operations 1140-1190 to render a map extent of the modified view of the map.

Figure 12:
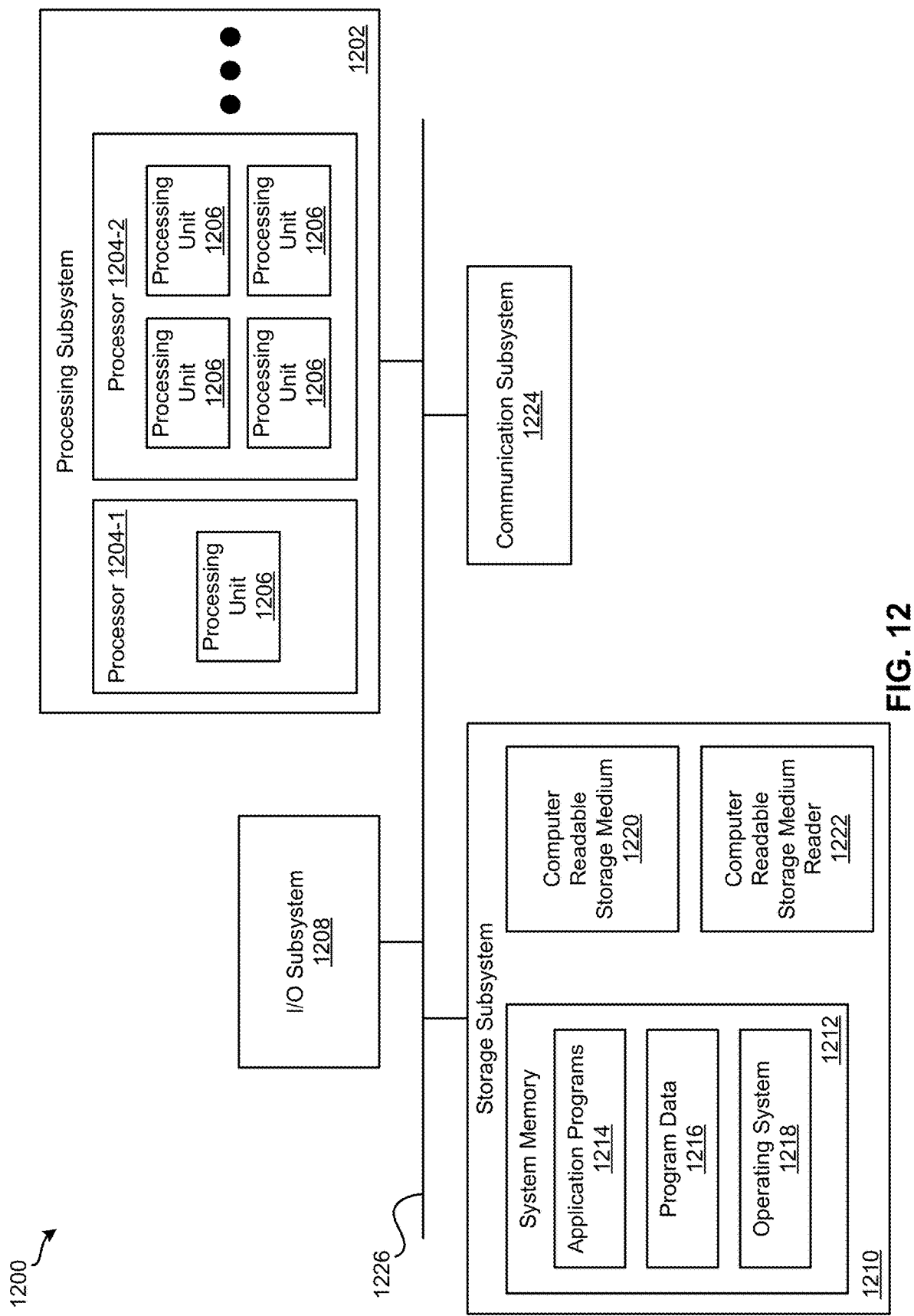
FIG. 12 illustrates an exemplary computer system, in which various embodiments may be implemented.

FIG. 12 illustrates an exemplary computer system 1200, in which various embodiments may be implemented. For example, computer system 1200 may be used to implement client device 105 and geo-enriched data system 120. Computer system 1200 may be a desktop computer, a laptop, a server computer, or any other type of computer system or combination thereof. Some or all elements of geo-enriched data system 120, or combinations thereof can be included or implemented in computer system 1200. In addition, computer system 1200 can implement many of the operations, methods, and/or processes described above (e.g., processes 700, 900, and 1100). As shown in FIG. 12, computer system 1200 includes processing subsystem 1202, which communicates, via bus subsystem 1226, with input/output (I/O) subsystem 1208, storage subsystem 1210 and communication subsystem 1224.

Bus subsystem 1226 is configured to facilitate communication among the various components and subsystems of computer system 1200. While bus subsystem 1226 is illustrated in FIG. 12 as a single bus, one of ordinary skill in the art will understand that bus subsystem 1226 may be implemented as multiple buses. Bus subsystem 1226 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1202, which can be implemented as one or more integrated circuits (e.g., a conventional microprocessor or microcontroller), controls the operation of computer system 1200. Processing subsystem 1202 may include one or more processors 1204. Each processor 1204 may include one processing unit 1206 (e.g., a single core processor such as processor 1204-1) or several processing units 1206 (e.g., a multicore processor such as processor 1204-2). In some embodiments, processors 1204 of processing subsystem 1202 may be implemented as independent processors while, in other embodiments, processors 1204 of processing subsystem 1202 may be implemented as multiple processors integrate into a single chip or multiple chips. Still, in some embodiments, processors 1204 of processing subsystem 1202 may be implemented as a combination of independent processors and multiple processors integrated into a single chip or multiple chips.

In some embodiments, processing subsystem 1202 can execute a variety of programs or processes in response to program code and can maintain multiple concurrently executing programs or processes. At any given time, some or all of the program code to be executed can reside in processing subsystem 1202 and/or in storage subsystem 1210. Through suitable programming, processing subsystem 1202 can provide various functionalities, such as the functionalities described above by reference to processes 700, 900, 1100, etc.

I/O subsystem 1208 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1200 to a user or another device (e.g., a printer).

As illustrated in FIG. 12, storage subsystem 1210 includes system memory 1212, computer-readable storage medium 1220, and computer-readable storage medium reader 1222. System memory 1212 may be configured to store software in the form of program instructions that are loadable and executable by processing subsystem 1202 as well as data generated during the execution of program instructions. In some embodiments, system memory 1212 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1212 may include different types of memory, such as static random access memory (SRAM) and/or dynamic random access memory (DRAM). System memory 1212 may include a basic input/output system (BIOS), in some embodiments, that is configured to store basic routines to facilitate transferring information between elements within computer system 1200 (e.g., during start-up). Such a BIOS may be stored in ROM (e.g., a ROM chip), flash memory, or any other type of memory that may be configured to store the BIOS.

As shown in FIG. 12, system memory 1212 includes application programs 1214, program data 1216, and operating system (OS) 1218. OS 1218 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/

Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1220 may be a non-transitory computer-readable medium configured to store software (e.g., programs, code modules, data constructs, instructions, etc.). Many of the components (e.g., geo data client manager 110, map renderer 115, geo query manager 130, clustering engine 135, query processor 145, cluster manager 805, merging engine 810, and attribute manager 815) and/or processes (e.g., processes 700, 900, and 1100) described above may be implemented as software that when executed by a processor or processing unit (e.g., a processor or processing unit of processing subsystem 1202) performs the operations of such components and/or processes. Storage subsystem 1210 may also store data used for, or generated during, the execution of the software.

Storage subsystem 1210 may also include computer-readable storage medium reader 1222 that is configured to communicate with computer-readable storage medium 1220. Together and, optionally, in combination with system memory 1212, computer-readable storage medium 1220 may comprehensively represent remote, local, fixed, and/or removable storage devices plus storage media for temporarily and/or more permanently containing, storing, transmitting, and retrieving computer-readable information.

Computer-readable storage medium 1220 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1224 serves as an interface for receiving data from, and transmitting data to, other devices, computer systems, and networks. For example, communication subsystem 1224 may allow computer system 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1224 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1224 may provide components configured for wired communication (e.g., Ethernet) in addition to or instead of components configured for wireless communication.

One of ordinary skill in the art will realize that the architecture shown in FIG. 12 is only an example architecture of computer system 1200, and that computer system 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
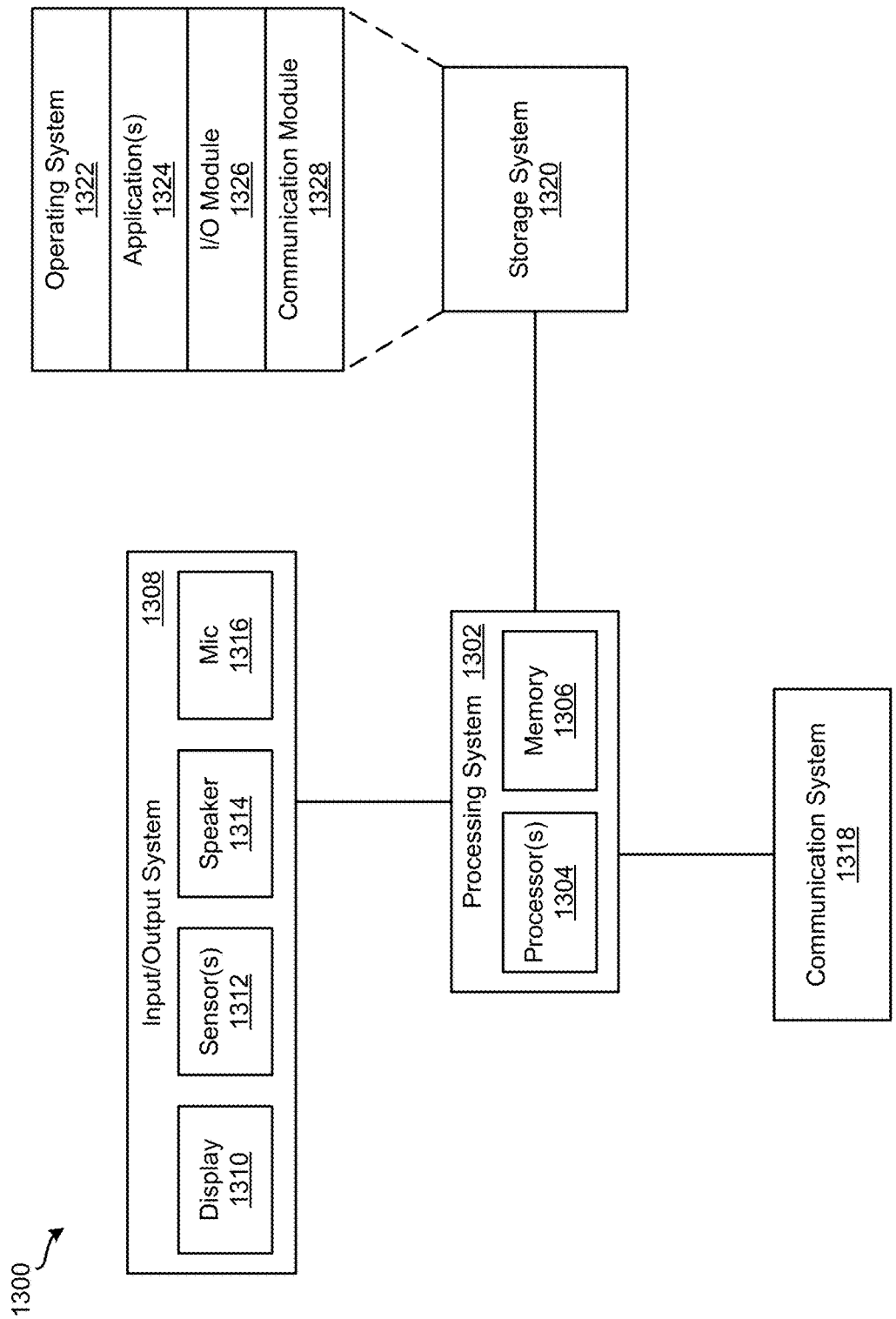
FIG. 13 illustrates an exemplary computing device, in which various embodiments may be implemented.

FIG. 13 illustrates an exemplary computing device 1300, in which various embodiments may be implemented. For example, computing device 1300 may be used to implement client device 105. Computing device 1300 may be a cellphone, a smartphone, a wearable device, an activity tracker or manager, a tablet, a personal digital assistant (PDA), a media player, or any other type of mobile computing device or combination thereof. Some or all elements of client device 105, or combinations thereof can be included or implemented in computing device 1300. In addition, computing device 1300 can implement many of the operations, methods, and/or processes described above (e.g., processes 900 and 1100). As shown in FIG. 13, computing device 1300 includes processing system 1302, input/output (I/O) system 1308, communication system 1318, and storage system 1320. These components may be coupled by one or more communication buses or signal lines.

Processing system 1302, which can be implemented as one or more integrated circuits (e.g., a conventional microprocessor or microcontroller), controls the operation of computing device 1300. As shown, processing system 1302 includes one or more processors 1304 and memory 1306. Processors 1304 are configured to run or execute various software and/or sets of instructions stored in memory 1306 to perform various functions for computing device 1300 and to process data.

Each processor of processors 1304 may include one processing unit (e.g., a single core processor) or several processing units (e.g., a multicore processor). In some embodiments, processors 1304 of processing system 1302 may be implemented as independent processors while, in other embodiments, processors 1304 of processing system 1302 may be implemented as multiple processors integrate into a single chip. Still, in some embodiments, processors 1304 of processing system 1302 may be implemented as a combination of independent processors and multiple processors integrated into a single chip.

Memory 1306 may be configured to receive and store software (e.g., operating system 1322, applications 1324, I/O module 1326, communication module 1328, etc. from storage system 1320) in the form of program instructions that are loadable and executable by processors 1304 as well as data generated during the execution of program instructions. In some embodiments, memory 1306 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1308 is responsible for receiving input through various components and providing output through various components. As shown for this example, I/O system 1308 includes display 1310, one or more sensors 1312, speaker 1314, and microphone 1316. Display 1310 is configured to output visual information (e.g., a graphical user interface (GUI) generated and/or rendered by processors 1304). In some embodiments, display 1310 is a touch screen that is configured to also receive touch-based input. Display 1310 may be implemented using liquid crystal display (LCD)

technology, light-emitting diode (LED) technology, organic LED (OLED) technology, organic electro luminescence (OEL) technology, or any other type of display technologies. Sensors 1312 may include any number of different types of sensors for measuring a physical quantity (e.g., temperature, force, pressure, acceleration, orientation, light, radiation, etc.). Speaker 1314 is configured to output audio information and microphone 1316 is configured to receive audio input. One of ordinary skill in the art will appreciate that I/O system 1308 may include any number of additional, fewer, and/or different components. For instance, I/O system 1308 may include a keypad or keyboard for receiving input, a port for transmitting data, receiving data and/or power, and/or communicating with another device or component, an image capture component for capturing photos and/or videos, etc.

Communication system 1318 serves as an interface for receiving data from, and transmitting data to, other devices, computer systems, and networks. For example, communication system 1318 may allow computing device 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1318 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1318 may provide components configured for wired communication (e.g., Ethernet) in addition to or instead of components configured for wireless communication.

Storage system 1320 handles the storage and management of data for computing device 1300. Storage system 1320 may be implemented by one or more non-transitory machine-readable mediums that are configured to store software (e.g., programs, code modules, data constructs, instructions, etc.) and store data used for, or generated during, the execution of the software. Many of the components (e.g., geo data client manager 110, and map renderer 115, cluster manager 805, merging engine 810, and attribute manager 815) and/or processes (e.g., processes 900 and 1100) described above may be implemented as software that when executed by a processor or processing unit (e.g., processors 1304 of processing system 1302) performs the operations of such components and/or processes.

In this example, storage system 1320 includes operating system 1322, one or more applications 1324, I/O module 1326, and communication module 1328. Operating system 1322 includes various procedures, sets of instructions, software components and/or drivers for controlling and managing general system tasks (e.g., memory management, storage device control, power management, etc.) and facilitates communication between various hardware and software components. Operating system 1322 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1324 can include any number of different applications installed on computing device 1300. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1326 manages information received via input components (e.g., display 1310, sensors 1312, and microphone 1316) and information to be outputted via output components (e.g., display 1310 and speaker 1314). Communication module 1328 facilitates communication with other devices via communication system 1318 and includes various software components for handling data received from communication system 1318.

One of ordinary skill in the art will realize that the architecture shown in FIG. 13 is only an example architecture of computing device 1300, and that computing device 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
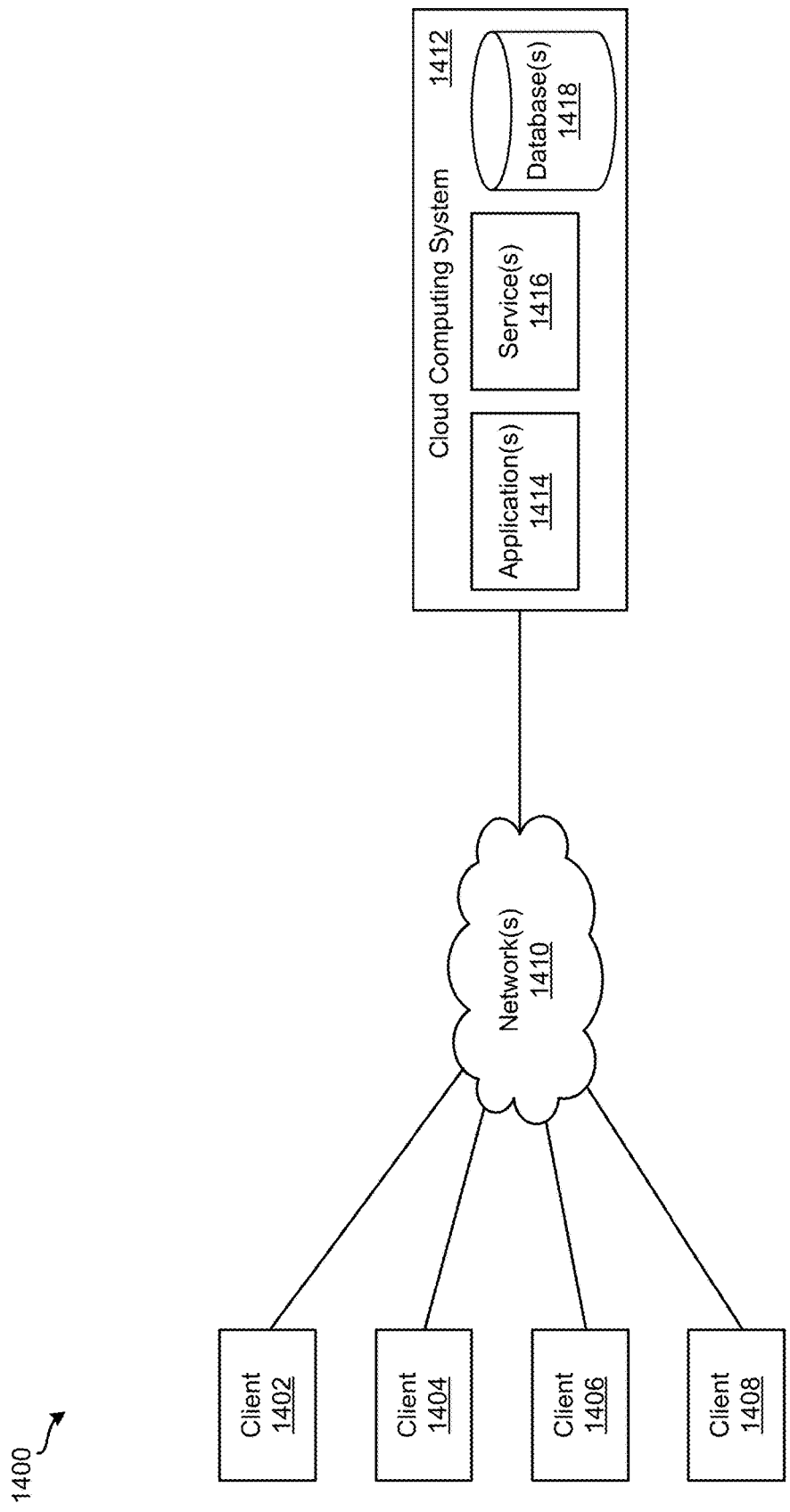
FIG. 14 illustrates system for implementing various embodiments described above.

FIG. 14 illustrates system 1400 for implementing various embodiments described above. For example, cloud computing system 1412 of system 1400 may be used to implement geo-enriched data system 120 and one of the clients 1402-1408 may be used to implement client device 105. As shown, system 1400 includes client devices 1402-1408, one or more networks 1410, and cloud computing system 1412. Cloud computing system 1412 is configured to provide resources and data to client devices 1402-1408 via networks 1410. In some embodiments, cloud computing system 1400 provides resources to any number of different users (e.g., customers, tenants, organizations, etc.). Cloud computing system 1412 may be implemented by one or more computer systems (e.g., servers), virtual machines operating on a computer system, or a combination thereof.

As shown, cloud computing system 1412 includes one or more applications 1414, one or more services 1416, and one or more databases 1418. Cloud computing system 1400 may provide applications 1414, services 1416, and databases 1418 to any number of different customers in a self-service, subscription-based, elastically scalable, reliable, highly available, and secure manner.

In some embodiments, cloud computing system 1400 may be adapted to automatically provision, manage, and track a customer's subscriptions to services offered by cloud computing system 1400. Cloud computing system 1400 may provide cloud services via different deployment models. For example, cloud services may be provided under a public cloud model in which cloud computing system 1400 is owned by an organization selling cloud services and the cloud services are made available to the general public or different industry enterprises. As another example, cloud services may be provided under a private cloud model in which cloud computing system 1400 is operated solely for a single organization and may provide cloud services for one or more entities within the organization. The cloud services may also be provided under a community cloud model in which cloud computing system 1400 and the cloud services provided by cloud computing system 1400 are shared by several organizations in a related community. The cloud services may also be provided under a hybrid cloud model, which is a combination of two or more of the aforementioned different models.

In some instances, any one of applications 1414, services 1416, and databases 1418 made available to client devices 1402-1408 via networks 1410 from cloud computing system 1400 is referred to as a "cloud service." Typically, servers and systems that make up cloud computing system 1400 are different from the on-premises servers and systems of a customer. For example, cloud computing system 1400 may host an application and a user of one of client devices 1402-1408 may order and use the application via networks 1410.

Applications 1414 may include software applications that are configured to execute on cloud computing system 1412 (e.g., a computer system or a virtual machine operating on a computer system) and be accessed, controlled, managed, etc. via client devices 1402-1408. In some embodiments, applications 1414 may include server applications and/or mid-tier applications (e.g., HTTP (hypertext transport protocol) server applications, FTP (file transfer protocol) server applications, CGI (common gateway interface) server applications, JAVA server applications, etc.). Services 1416 are software components, modules, application, etc. that are configured to execute on cloud computing system 1412 and provide functionalities to client devices 1402-1408 via networks 1410. Services 1416 may be web-based services or on-demand cloud services.

Databases 1418 are configured to store and/or manage data that is accessed by applications 1414, services 1416, and/or client devices 1402-1408. For instance, storages 150 and 155 may be stored in databases 1418. Databases 1418 may reside on a non-transitory storage medium local to (and/or resident in) cloud computing system 1412, in a storage-area network (SAN), on a non-transitory storage medium local located remotely from cloud computing system 1412. In some embodiments, databases 1418 may include relational databases that are managed by a relational database management system (RDBMS). Databases 1418 may be a column-oriented databases, row-oriented databases, or a combination thereof. In some embodiments, some or all of databases 1418 are in-memory databases. That is, in some such embodiments, data for databases 1418 are stored and managed in memory (e.g., random access memory (RAM)).

Client devices 1402-1408 are configured to execute and operate a client application (e.g., a web browser, a proprietary client application, etc.) that communicates with applications 1414, services 1416, and/or databases 1418 via networks 1410. This way, client devices 1402-1408 may access the various functionalities provided by applications 1414, services 1416, and databases 1418 while applications 1414, services 1416, and databases 1418 are operating (e.g., hosted) on cloud computing system 1400. Client devices 1402-1408 may be computer system 1200 or computing device 1300, as described above by reference to FIGS. 12 and 13, respectively. Although system 1400 is shown with four client devices, any number of client devices may be supported.

Networks 1410 may be any type of network configured to facilitate data communications among client devices 1402-1408 and cloud computing system 1412 using any of a variety of network protocols. Networks 1410 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

sending, from the computing device to a computing system, a query for clusters generated from a set of geo-enriched data, wherein the query specifies a maximum number of clusters, wherein each geo-enriched data in the set of geo-enriched data comprises spatial data to which location data is converted, wherein the location data describes a location, area, or region;

receiving, at the computing device from the computing system, a set of clusters responsive to the query and generated from the set of geo-enriched data, wherein each cluster in the set of clusters comprises a number of geo-enriched data represented by the cluster;

identifying, by the computing device, a subset of the set of clusters that intersect a map extent of a map;

determining, by the computing device, whether the number of geo-enriched data defined by the subset of the set of clusters is greater than a threshold number of data points;

upon determining that the number of geo-enriched data defined by the spatial data represented by the subset of the set of clusters is greater than the threshold number, rendering the map extent of the map to include the number of geo-enriched data of the subset of the set of clusters, the rendering comprising:

merging, by the computing device, the subset of the set of clusters to form a set of cluster groups; and rendering the map extent of the map to include the set of cluster groups; and upon determining that the number of geo-enriched data defined by the spatial data represented by the subset of the set of clusters is not greater than the threshold number:

sending the computing system a query for geo-enriched data in the set of geo-enriched data that is within the map extent;

receiving from the computing system the geo-enriched data in the set of geo-enriched data that is within the map extent; and rendering the map extent of the map to include the number of geo-enriched data defined by the spatial data represented by the geo-enriched data in the set of geo-enriched data that is within the map extent.

2. The non-transitory machine-readable medium of claim 1, wherein merging the subset of the set of clusters comprises, for each cluster in the subset of the set of clusters:

determining, by the computing device, a pixel distance between the cluster and a cluster group in the set of cluster groups by calculating a spatial distance between a reference point of the cluster and a reference point of the cluster group and dividing the spatial distance by a map resolution;

adding, by the computing device, the cluster to the cluster group in the set of cluster groups when the pixel distance between the cluster and the cluster group is less than a defined pixel distance; and creating, by the computing device, a new cluster group in the set of cluster groups and adding the cluster to the new cluster group when the pixel distance between the cluster and the cluster group is not less than the defined pixel distance.

3. The non-transitory machine-readable medium of claim 2, wherein adding the cluster to the cluster group in the set of cluster groups comprises updating the reference point of the cluster group based on the reference point of the cluster, a size of the cluster, and a size of the cluster group.

4. The non-transitory machine-readable medium of claim 2, wherein adding the cluster to the cluster group in the set of cluster groups comprises updating a size of the cluster group based on a size of the cluster and the size of the cluster group.

5. The non-transitory machine-readable medium of claim 1, wherein each geo-enriched data in the set of geo-enriched data comprises an attribute, wherein the program further comprises a set of instructions for sending a request for a maximum value of the attribute in the set of geo-enriched data and a minimum value of the attribute in the set of geo-enriched data, wherein rendering the map extent of the map to include the subset of the set of geo-enriched data comprises rendering a visual representation of a geo-enriched data in the subset of the set of geo-enriched data based on a value of the attribute of the geo-enriched data relative to the maximum value and the minimum value.

6. The non-transitory machine-readable medium of claim 1, wherein the map extent is a first map extent of the map, wherein the subset of the set of clusters is a first subset of the set of clusters, wherein the query is a first query, wherein the subset of the set of geo-enriched data is a first subset of the set of geo-enriched data, wherein the program further comprises sets of instructions for:

receiving a request to render a second map extent of the map;

identifying, by the computing device, a second subset of the set of clusters that intersect the second map extent;

determining, by the computing device, whether a number of geo-enriched data defined by the second subset of the set of clusters is greater than the threshold number;

upon determining that the number of geo-enriched data defined by the spatial data represented by the second subset of the set of clusters is greater than the threshold number, rendering the second map extent of the map to include the number of geo-enriched data of the second subset of the set of clusters; and upon determining that the number of geo-enriched data defined by the spatial data represented by the second subset of the set of clusters is not greater than the threshold number:

sending the computing system a second query for geo-enriched data in the set of geo-enriched data that is within the second map extent;

receiving from the computing system the geo-enriched data in the set of geo-enriched data that is within the second map extent; and rendering the second map extent of the map to include the number of geo-enriched data defined by the spatial data represented by the geo-enriched data in the set of geo-enriched data that is within the second map extent.

7. A method comprising:

sending, from a computing device to a computing system, a query for clusters generated from a set of geo-enriched data, wherein the query specifies a maximum number of clusters, wherein each geo-enriched data in the set of geo-enriched data comprises spatial data to which location data is converted, wherein the location data describes a location, area, or region;

receiving, at the computing device from the computing system, a set of clusters responsive to the query and generated from the set of geo-enriched data, wherein each cluster in the set of clusters comprises a number of geo-enriched data represented by the cluster;

identifying, by the computing device, a subset of the set of clusters that intersect a map extent of a map;

determining, by the computing device, whether the number of geo-enriched data defined by the spatial data represented by the subset of the set of clusters is greater than a threshold number of data points;

upon determining that the number of geo-enriched data defined by the spatial data represented by the subset of the set of clusters is greater than the threshold number, rendering the map extent of the map to include the number of geo-enriched data of the subset of the set of clusters, the rendering comprising:

merging, by the computing device, the subset of the set of clusters to form a set of cluster groups; and rendering the map extent of the map to include the set of cluster groups; and upon determining that the number of geo-enriched data defined by the spatial data represented by the subset of the set of clusters is not greater than the threshold number:

sending the computing system a query for geo-enriched data in the set of geo-enriched data that is within the map extent;

receiving from the computing system the geo-enriched data in the set of geo-enriched data that is within the map extent; and rendering the map extent of the map to include the number of geo-enriched data defined by the spatial data represented by geo-enriched data in the set of geo-enriched data that is within the map extent.

8. The method of claim 7, wherein merging the subset of the set of clusters comprises, for each cluster in the subset of the set of clusters:

determining, by the computing device, a pixel distance between the cluster and a cluster group in the set of cluster groups by calculating a spatial distance between a reference point of the cluster and a reference point of the cluster group and dividing the spatial distance by a map resolution;

adding, by the computing device, the cluster to the cluster group in the set of cluster groups when the pixel distance between the cluster and the cluster group is less than a defined pixel distance; and creating, by the computing device, a new cluster group in the set of cluster groups and adding the cluster to the new cluster group when the pixel distance between the cluster and the cluster group is not less than the defined pixel distance.

9. The method of claim 8, wherein adding the cluster to the cluster group in the set of cluster groups comprises updating the reference point of the cluster group based on the reference point of the cluster, a size of the cluster, and a size of the cluster group.

10. The method of claim 8, wherein adding the cluster to the cluster group in the set of cluster groups comprises updating a size of the cluster group based on a size of the cluster and the size of the cluster group.

11. The method of claim 7, wherein each geo-enriched data in the set of geo-enriched data comprises an attribute, wherein the method further comprises sending a request for a maximum value of the attribute in the set of geo-enriched data and a minimum value of the attribute in the set of geo-enriched data, wherein rendering the map extent of the map to include the subset of the set of geo-enriched data comprises rendering a visual representation of a geo-enriched data in the subset of the set of geo-enriched data based on a value of the attribute of the geo-enriched data relative to the maximum value and the minimum value.

12. The method of claim 7, wherein the map extent is a first map extent of the map, wherein the subset of the set of clusters is a first subset of the set of clusters, wherein the query is a first query, wherein the subset of the set of geo-enriched data is a first subset of the set of geo-enriched data, wherein the method further comprises:

receiving a request to render a second map extent of the map;

identifying, by the computing device, a second subset of the set of clusters that intersect the second map extent;

determining, by the computing device, whether a number of geo-enriched data defined by the spatial data represented by the second subset of the set of clusters is greater than the threshold number;

upon determining that the number of geo-enriched data defined by the spatial data represented by the second subset of the set of clusters is greater than the threshold number, rendering the second map extent of the map to include the number of geo-enriched data of the second subset of the set of clusters; and upon determining that the number of geo-enriched data defined by the spatial data represented by the second subset of the set of clusters is not greater than the threshold number:

sending the computing system a second query for geo-enriched data in the set of geo-enriched data that is within the second map extent;

receiving from the computing system the geo-enriched data in the set of geo-enriched data that is within the second map extent; and rendering the second map extent of the map to include the number of geo-enriched data defined by the spatial data represented by the geo-enriched data in the set of geo-enriched data that is within the second map extent.

13. A system comprising:
a set of processing units; and
a non-transitory computer-readable medium storing instructions that when executed by at least one processing unit in the set of processing units cause the at least one processing unit to:

send, from a computing device to a computing system, a query for clusters generated from a set of geo-enriched data, wherein the query specifies a maximum number of clusters, wherein each geo-enriched data in the geo-enriched data comprises spatial data to which location data is converted, wherein the location data describes a location, area, or region;

receive, at the computing device from the computing system, a set of clusters responsive to the query and generated from the set of geo-enriched data, wherein each cluster in the set of clusters comprises a number of geo-enriched data represented by the cluster;

identify, by the computing device, a subset of the set of clusters that intersect a map extent of a map;

determining, by the computing device, whether the number of geo-enriched data defined by the subset of the set of clusters is greater than a threshold number of data points;

upon determining that the number of geo-enriched data defined by the spatial data represented by the subset of the set of clusters is greater than the threshold number, render the map extent of the map to include the number of geo-enriched data of the subset of the set of clusters, the rendering comprising:

merging, by the computing device, the subset of the set of clusters to form a set of cluster groups; and rendering the map extent of the map to include the set of cluster groups; and upon determining that the number of geo-enriched data defined by the spatial data represented by the subset of the set of clusters is not greater than the threshold number:

send the computing system a query for geo-enriched data in the set of geo-enriched data that is within the map extent;

receive from the computing system the geo-enriched data in the set of geo-enriched data that is within the map extent; and render the map extent of the map to include the number of geo-enriched data defined by the spatial data represented by the geo-enriched data in the set of geo-enriched data that is within the map extent.

14. The system of claim 13, wherein merging the subset of the set of clusters comprises, for each cluster in the subset of the set of clusters:

determining, by the computing device, a pixel distance between the cluster and a cluster group in the set of cluster groups by calculating a spatial distance between a reference point of the cluster and a reference point of the cluster group and dividing the spatial distance by a map resolution;

adding, by the computing device, the cluster to the cluster group in the set of cluster groups when the pixel distance between the cluster and the cluster group is less than a defined pixel distance; and creating, by the computing device, a new cluster group in the set of cluster groups and adding the cluster to the new cluster group when the pixel distance between the cluster and the cluster group is not less than the defined pixel distance.

15. The system of claim 14, wherein adding the cluster to the cluster group in the set of cluster groups comprises:

updating the reference point of the cluster group based on the reference point of the cluster, a size of the cluster, and a size of the cluster group; and updating a size of the cluster group based on a size of the cluster and the size of the cluster group.

16. The system of claim 13, wherein each geo-enriched data in the set of geo-enriched data comprises an attribute, wherein the instructions further cause the at least one processing unit to send a request for a maximum value of the attribute in the set of geo-enriched data and a minimum value of the attribute in the set of geo-enriched data, wherein rendering the map extent of the map to include the subset of the set of geo-enriched data comprises rendering a visual representation of a geo-enriched data in the subset of the set of geo-enriched data based on a value of the attribute of the geo-enriched data relative to the maximum value and the minimum value.

17. The system of claim 13, wherein the map extent is a first map extent of the map, wherein the subset of the set of clusters is a first subset of the set of clusters, wherein the query is a first query, wherein the subset of the set of geo-enriched data is a first subset of the set of geo-enriched data, wherein the instructions further cause the at least one processing unit to:
  receive a request to render a second map extent of the map;
  identify, by the computing device, a second subset of the set of clusters that intersect the second map extent;
  determining, by the computing device, whether the number of geo-enriched data defined by the second subset of the set of clusters is greater than the threshold number;
  upon determining that the number of geo-enriched data defined by the spatial data represented by the second subset of the set of clusters is greater than the threshold number, render the second map extent of the map to include the number of geo-enriched data of the second subset of the set of clusters; and
  upon determining that the number of geo-enriched data defined by the spatial data represented by the second subset of the set of clusters is not greater than the threshold number:
    send the computing system a second query for geo-enriched data in the set of geo-enriched data that is within the second map extent;
    receive from the computing system the geo-enriched data in the set of geo-enriched data that is within the second map extent; and
    render the second map extent of the map to include the number of geo-enriched data defined by the spatial data represented by the geo-enriched data in the set of geo-enriched data that is within the second map extent.

* * * * *